US010680759B2

(12) United States Patent
Wang et al.

(10) Patent No.: US 10,680,759 B2
(45) Date of Patent: Jun. 9, 2020

(54) DATA TRANSMISSION METHOD AND APPARATUS

(71) Applicant: Huawei Technologies Co., Ltd., Shenzhen (CN)

(72) Inventors: Fanzhao Wang, Shenzhen (CN); Jun Yang, Dongguan (CN); Kai Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/251,790

(22) Filed: Jan. 18, 2019

(65) Prior Publication Data

US 2019/0158228 A1 May 23, 2019

Related U.S. Application Data

(63) Continuation of application No. PCT/CN2017/074340, filed on Feb. 22, 2017.

(30) Foreign Application Priority Data

Jul. 19, 2016 (CN) .......................... 2016 1 0573028

(51) Int. Cl.
*H04L 1/16* (2006.01)
*H04L 29/06* (2006.01)
*H04L 12/24* (2006.01)
*H04L 1/18* (2006.01)
(Continued)

(52) U.S. Cl.
CPC .............. *H04L 1/1657* (2013.01); *H04L 1/08* (2013.01); *H04L 1/1819* (2013.01); *H04L 29/06* (2013.01);
(Continued)

(58) Field of Classification Search
CPC ..... H04L 1/1657; H04L 1/1819; H04L 29/06; H04L 43/0829; H04L 43/0852; H04L 43/50
See application file for complete search history.

(56) References Cited

U.S. PATENT DOCUMENTS 8,457,492 B2  6/2013  Ohira et al.
9,131,498 B2  9/2015  Au et al.
(Continued)

FOREIGN PATENT DOCUMENTS

CN   101162978 A   4/2008
CN   101500259 A   8/2009
(Continued)

OTHER PUBLICATIONS

Machine Translation and Abstract of Chinese Publication No. CN104660380, May 27, 2015, 17 pages.
(Continued)

*Primary Examiner* — Ronald B Abelson
(74) *Attorney, Agent, or Firm* — Conley Rose, P.C.

(57) ABSTRACT

A data transmission method and apparatus, where a transmission end determines a redundancy time according to a delay requirement of a service, where the redundancy time indicates a time used for transmitting redundant data of native data of the service, and the redundancy time is less than or equal to a time indicated by the delay requirement. The transmission end determines a redundancy quantity N. The transmission end determines N redundancy transmission time intervals according to the redundancy time and the redundancy quantity. After the native data of the service is sent, in case of feedback data is not received within an $n^{th}$ redundancy transmission time interval, transmitting the redundant data of the native data for the $n^{th}$ time according to the $n^{th}$ redundancy transmission time interval.

20 Claims, 10 Drawing Sheets

(51) Int. Cl.
*H04L 12/26* (2006.01)
*H04L 1/08* (2006.01)

(52) U.S. Cl.
CPC ...... *H04L 43/0829* (2013.01); *H04L 43/0852* (2013.01); *H04L 43/50* (2013.01)

(56) References Cited

U.S. PATENT DOCUMENTS

| | | | |
|---|---|---|---|
| 9,166,853 | B2 | 10/2015 | Afkhami et al. |
| 2006/0056416 | A1* | 3/2006 | Yang ..................... H04L 12/28 |
| 2015/0181563 | A1 | 6/2015 | Kubota et al. |

FOREIGN PATENT DOCUMENTS

| | | |
|---|---|---|
| CN | 101765147 A | 6/2010 |
| CN | 101141178 B | 2/2012 |
| CN | 103609181 A | 2/2014 |
| CN | 104660380 A | 5/2015 |
| CN | 105490773 A | 4/2016 |
| EP | 3282591 A1 | 2/2018 |
| WO | 2013166964 A1 | 11/2013 |
| WO | 2016015213 A1 | 2/2016 |

OTHER PUBLICATIONS

Machine Translation and Abstract of International Publication No. WO2013166964, Nov. 14, 2013, 20 pages.
Machine Translation and Abstract of Chinese Publication No. CN105490773, Apr. 13, 2016, 21 pages.
Foreign Communication From a Counterpart Application, Chinese Application No. 201610573028.3, Chinese Office Action dated May 31, 2019, 3 pages.
Foreign Communication From a Counterpart Application, Chinese Application No. 201610573028.3, Chinese Search Report dated May 22, 2019, 2 pages.
Foreign Communication From a Counterpart Application, European Application No. 17830201.4, Extended European Search Report dated May 24, 2019, 10 pages.
Machine Translation and Abstract of Chinese Publication No. CN101141178, Feb. 22, 2012, 9 pages.
Machine Translation and Abstract of Chinese Publication No. CN101162978, Apr. 16, 2008, 13 pages.
Machine Translation and Abstract of Chinese Publication No. CN101500259, Aug. 5, 2009, 19 pages.
Machine Translation and Abstract of Chinese Publication No. CN101765147, Jun. 30, 2010, 15 pages.
Choffnes, D., et al, "Taming the Torrent, A Practical Approach to Reducing Cross-ISP Traffic in Peer-to-Peer Systems," SIGCOMM'08, Aug. 17-22, 2008, 12 pages.
Foreign Communication From a Counterpart Application, PCT Application No. PCT/CN2017/074340, English Translation of International Search Report dated May 26, 2017, 2 pages.
Foreign Communication From a Counterpart Application, PCT Application No. PCT/CN2017/074340, English Translation of Written Opinion dated May 26, 2017, 4 pages.

\* cited by examiner

200

```
┌─────────────────────────────────────────────────┐
│ Determine a redundancy time according to a delay │
│ requirement of a service, where the redundancy time indicates │  S210
│ a time used for sending redundant data of native data of the │
│ service, and the redundancy time is less than or equal to a time │
│ indicated by the delay requirement │
└─────────────────────────────────────────────────┘
                          │
                          ▼
┌─────────────────────────────────────────────────┐
│ Determine a redundancy quantity N, where the redundancy │
│ quantity N indicates a quantity of times of transmitting the │  S220
│ redundant data, and N is a positive integer │
└─────────────────────────────────────────────────┘
                          │
                          ▼
┌─────────────────────────────────────────────────┐
│ Determine N redundancy transmission time intervals │
│ according to the redundancy time and the redundancy │
│ quantity, where a total time of the N redundancy transmission │  S230
│ time intervals is less than or equal to the redundancy time │
└─────────────────────────────────────────────────┘
                          │
                          ▼
┌─────────────────────────────────────────────────┐
│ After the native data of the target service is sent, if feedback │
│ data is not received within an $n^{th}$ redundancy transmission │
│ time interval, send the redundant data of the native data for the │  S240
│ $n^{th}$ time according to the $n^{th}$ redundancy transmission time │
│ interval, where n is 1, ..., N │
└─────────────────────────────────────────────────┘
```

DATA TRANSMISSION METHOD AND APPARATUS

CROSS-REFERENCE TO RELATED APPLICATIONS

This application is a continuation of International Patent Application No. PCT/CN2017/074340 filed on Feb. 22, 2017, which claims priority to Chinese Patent Application No. 201610573028.3 filed on Jul. 19, 2016. The disclosures of the aforementioned applications are hereby incorporated by reference in their entireties.

TECHNICAL FIELD

This application relates to the communications field, and in particular, to a data transmission method and apparatus.

BACKGROUND

The Transmission Control Protocol (TCP) is widely used for providing a reliable transmission service. A packet loss in a network cannot be avoided. In a conventional solution, a data packet that is acknowledged to be lost is resent using a timeout-based retransmission mechanism. For example, after a transmit end sends a data packet, if a corresponding acknowledgement (ACK) response sent by a receive end is not received within preset duration, it is considered that the sent data packet is lost, and the timeout-based retransmission mechanism is triggered to resend the data packet. However, the timeout-based retransmission mechanism is a retransmission mechanism with an exponentially increasing time interval. That is, a current retransmission time interval is greater than a former retransmission time interval, and the time interval increases exponentially. Therefore, the timeout-based retransmission mechanism cannot meet a requirement of a real-time service for TCP delay performance. How to improve the TCP delay performance is an important aspect for improving the TCP.

In other approaches, a Forward Error Correction (FEC) technology is used to resolve a problem of the TCP delay performance. In the FEC technology, a quantity of redundancy transmission times and a total time length of redundancy transmission are determined according to only network status information. This may reduce a timeout-based retransmission probability, but may cause unnecessary redundancy transmission, increasing unnecessary network overheads.

SUMMARY

This application provides a data transmission method and apparatus in order to not only improve TCP delay performance but also effectively reduce unnecessary redundancy transmission.

A first aspect provides a data transmission method, including determining a redundancy time according to a delay requirement of a service, where the redundancy time indicates a time used for transmitting redundant data of native data of the service, and the redundancy time is less than or equal to a time indicated by the delay requirement, determining a redundancy quantity N, where the redundancy quantity N indicates a quantity of times of transmitting the redundant data, and N is a positive integer, determining N redundancy transmission time intervals according to the redundancy time and the redundancy quantity N, where a total time of the N redundancy transmission time intervals is less than or equal to the redundancy time, and transmitting the redundant data of the native data for the $n^{th}$ time according to the $n^{th}$ redundancy transmission time interval after the native data of the service is sent, if feedback data is not received within an $n^{th}$ redundancy transmission time interval, where n is 1, . . . , N.

The redundancy transmission time interval is a time interval used for transmitting the redundant data.

It should be understood that none of the N redundancy transmission time intervals is less than a minimum transmission time interval. The minimum transmission time interval may be predefined by a system. Further, for example, the minimum transmission time interval is 20 ms (milliseconds).

In this solution, the redundancy time is determined according to the delay requirement of the service, then the redundancy transmission time intervals are determined according to the redundancy time and the redundancy quantity, and the redundant data of the service is further sent according to the determined redundancy transmission time intervals. The redundant data is sent, to reduce a timeout-based retransmission probability, thereby improving TCP delay performance. In addition, the redundancy time is determined according to the delay requirement of the service such that the total time of the redundancy transmission time intervals determined according to the redundancy time and the redundancy quantity falls within a time range corresponding to the delay requirement of the service. In comparison with an existing FEC technology in which a quantity of times and a total time length of redundancy transmission are determined according to only network status information, in this application, unnecessary redundancy transmission can be reduced to an extent. Therefore, in this application, not only the TCP delay performance can be improved, but also unnecessary redundancy transmission can be effectively reduced.

With reference to the first aspect, in a possible implementation of the first aspect, determining N redundancy transmission time intervals according to the redundancy time and the redundancy quantity includes determining the N redundancy transmission time intervals according to the redundancy time and the redundancy quantity, the N redundancy transmission time intervals include $N_1$ first redundancy transmission time intervals and $N_2$ second redundancy transmission time intervals, the $N_1$ first redundancy transmission time intervals are all greater than the $N_2$ second redundancy transmission time intervals, the $N_1$ first redundancy transmission time intervals are all earlier than the $N_2$ second redundancy transmission time intervals in terms of a time sequence, and a sum of $N_1$ and $N_2$ is equal to N.

In this solution, the N determined redundancy transmission time intervals are arranged from larger to smaller such that a probability of receiving the feedback data (for example, an ACK) within a first redundancy transmission time interval, a second redundancy transmission time interval, or a redundancy transmission time interval other than the last redundancy transmission time interval can be increased. It should be understood that, after the feedback data is received within an $x^{th}$ redundancy transmission time interval, the redundant data transmission stops being sent. There is no need to continue to transmitting the redundant data according to remaining redundancy transmission time intervals, and x is a positive integer less than n. Therefore, in this solution, unnecessary redundancy transmission can be further reduced.

With reference to some of the foregoing implementations of the first aspect, in a possible implementation of the first aspect, the method further includes stop transmitting the redundant data of the original data after the native data of the service is sent, if the feedback data is received within the $n^{th}$ redundancy transmission time interval.

In this solution, unnecessary redundancy transmission can be effectively reduced.

With reference to some of the foregoing implementations of the first aspect, in a possible implementation of the first aspect, the $N_1$ first redundancy transmission time intervals are all no less than a trusted feedback time, the $N_2$ second redundancy transmission time intervals are all less than the trusted feedback time, and the trusted feedback time indicates a time from a time point at which a transmit end sends data to a time point at which feedback data corresponding to the data is received by the transmit end.

It should be understood that, if the transmit end sends data to a receive end at a moment t1, and receives, at a moment t2, corresponding feedback data sent by the receive end, the trusted feedback time is equal to (t2−t1). When a redundancy transmission time interval is no less than the trusted feedback time, the feedback data can be received at a relatively high probability within the redundancy transmission time interval. Therefore, in this application, unnecessary redundancy transmission can be effectively reduced.

With reference to some of the foregoing implementations of the first aspect, in a possible implementation of the first aspect, determining N redundancy transmission time intervals according to the redundancy time and the redundancy quantity includes determining the N redundancy transmission time intervals according to the redundancy time and the redundancy quantity based on any one or a combination of random collision, formula calculation, or program building.

In some of the foregoing implementations, there may be a random value relationship among the $N_1$ first redundancy transmission time intervals, and there may be a random value relationship among the $N_2$ second redundancy transmission time intervals.

In some of the foregoing implementations, $N_1$ is equal to 1.

In some of the foregoing implementations, $N_2$ is equal to 1, and the $N_1$ first redundancy transmission time intervals are all equal to the trusted feedback time.

In some of the foregoing implementations, if the redundancy time is sufficient, each transmitting of the N redundancy transmission time intervals is greater than the trusted feedback time.

With reference to some of the foregoing implementations of the first aspect, in a possible implementation of the first aspect, determining N redundancy transmission time intervals according to the redundancy time and the redundancy quantity N includes determining the $n^{th}$ redundancy transmission time interval $T_p$ (n) according to the following formula:

$$T_p(n) = \text{MAX}\left(T_t \cdot \frac{2^{N \cdot n}}{2^N - 1}, TTI_{min}\right),$$

where MAX( ) indicates a function for obtaining a maximum value, $T_t$ indicates the redundancy time, n is 1, ..., N, $TTI_{min}$ and indicates a minimum transmission time interval.

With reference to some of the foregoing implementations of the first aspect, in a possible implementation of the first aspect, the determining a redundancy time according to a delay requirement of a service includes obtaining a service type of the service, obtaining a delay service level agreement (SLA) of the service according to the service type of the service, and determining the redundancy time according to the delay SLA.

Further, the redundancy time is calculated according to the delay SLA and a round trip time (RTT). The redundancy time is equal to a difference between the delay SLA and the RTT.

With reference to some of the foregoing implementations of the first aspect, in a possible implementation of the first aspect, determining a redundancy quantity N includes calculating the redundancy quantity N according to the following formula:

$$N = INT\left(\log_{LR}^{(1-SR)}\right),$$

where INT( ) is an integral function, LR indicates a packet loss rate, and SR indicates a delay assurance rate.

It should be understood that the delay assurance rate indicates a user requirement of a user for the service. Therefore, in this solution, the redundancy time is determined according to the delay requirement of the service, the redundancy quantity is determined according to network status information (that is, the packet loss rate) and the user requirement (that is, the delay assurance rate), and the N redundancy transmission time intervals are further determined according to the redundancy time and the redundancy quantity. In this solution, redundancy transmission time intervals are determined according to the delay requirement of the service, the user requirement, and the network status information, and then the redundant data is sent based on the determined redundancy transmission time intervals. In comparison with the existing FEC technology in which the quantity of times and the total time length of redundancy transmission are determined according to only the network status information, in this application, the delay requirement of the service can be ensured, and unnecessary redundancy transmission can be reduced to an extent.

With reference to some of the foregoing implementations of the first aspect, in a possible implementation of the first aspect, determining N redundancy transmission time intervals according to the redundancy time and the redundancy quantity N includes determining the N redundancy transmission time intervals according to the redundancy time and the redundancy quantity if a transmitting cache is not empty.

With reference to some of the foregoing implementations of the first aspect, in a possible implementation of the first aspect, the method further includes increasing the redundancy quantity by INT(N/2) if the feedback data is not received within a third redundancy transmission time interval.

Further, a time interval corresponding to an added redundancy quantity may be a minimum transmission time interval.

With reference to some of the foregoing implementations of the first aspect, in a possible implementation of the first aspect, the method further includes that in a process of transmitting the redundant data of the native data for the $n^{th}$ time according to the $n^{th}$ redundancy transmission time interval, collecting statistics about network status information, and updating the redundancy quantity and the redundancy transmission time interval according to latest obtained network status information, where the network status information includes the packet loss rate and the RTT.

In the foregoing implementations, the N redundancy transmission time intervals may be determined before the native data of the service is sent, or the N redundancy transmission time intervals may be determined after the native data of the service is sent.

In the foregoing implementations, the feedback data is, for example, an ACK packet.

A second aspect provides a data transmission method, including determining a redundancy time of a service, where the redundancy time indicates a time used for transmitting redundant data of native data of the service, determining a redundancy quantity N, where the redundancy quantity N indicates a quantity of times of transmitting the redundant data, and N is a positive integer, determining N redundancy transmission time intervals according to the redundancy time and the redundancy quantity, where a total time of the N redundancy transmission time intervals is less than or equal to the redundancy time, the N redundancy transmission time intervals include $N_1$ first redundancy transmission time intervals and $N_2$ second redundancy transmission time intervals, the $N_1$ first redundancy transmission time intervals are all greater than the $N_2$ second redundancy transmission time intervals, the $N_1$ first redundancy transmission time intervals are all earlier than the $N_2$ second redundancy transmission time intervals in terms of a time sequence, and a sum of $N_1$ and $N_2$ is equal to N, and transmitting the redundant data of the native data for the $n^{th}$ time according to the $n^{th}$ redundancy transmission time interval after the native data of the service is sent, if feedback data is not received within an $n^{th}$ redundancy transmission time interval, where n is 1, ..., N.

In this solution, the redundant data is sent to reduce a timeout-based retransmission probability, thereby improving TCP delay performance. In addition, in this solution, the N determined redundancy transmission time intervals are arranged from larger to smaller such that a probability of receiving the feedback data (for example, an ACK) within a first, a second, or a redundancy transmission time interval other than a last redundancy transmission time interval can be increased. It should be understood that, after the native data of the service is sent, if the feedback data is received within the $n^{th}$ redundancy transmission time interval, transmitting the redundant data of the native data stops being sent. In this case, the redundant data does not need to be sent according to remaining redundancy transmission time intervals, and n is less than N. Therefore, unnecessary redundancy transmission can be effectively reduced. Therefore, in this application, not only the TCP delay performance can be improved, but also unnecessary redundancy transmission can be effectively reduced.

With reference to the second aspect, in a possible implementation of the second aspect, the $N_1$ first redundancy transmission time intervals are all no less than a trusted feedback time, the $N_2$ second redundancy transmission time intervals are all less than the trusted feedback time, and the trusted feedback time indicates a time from a time point at which a transmit end sends data to a time point at which feedback data corresponding to the data is received by the transmit end.

With reference to some of the foregoing implementations of the second aspect, in a possible implementation of the second aspect, $N_2$ is equal to 1, and the $N_1$ first redundancy transmission time intervals are all equal to the trusted feedback time.

With reference to some of the foregoing implementations of the second aspect, in a possible implementation of the second aspect, determining N redundancy transmission time intervals according to the redundancy time and the redundancy quantity N includes determining the $n^{th}$ redundancy transmission time interval $T_p(n)$ according to the following formula:

$$T_p(n) = \mathrm{MAX}\left(T_t \cdot \frac{2^{N \cdot n}}{2^N - 1}, TTI_{min}\right),$$

where MAX( ) indicates a function for obtaining a maximum value, $T_t$ indicates the redundancy time, n is 1, ..., N, $TTI_{min}$ and indicates a minimum transmission time interval.

With reference to some of the foregoing implementations of the second aspect, in a possible implementation of the second aspect, the method further includes stop transmitting redundant data of the native data after the native data of the service is sent, if the feedback data is received within the $n^{th}$ redundancy transmission time interval.

With reference to some of the foregoing implementations of the second aspect, in a possible implementation of the second aspect, determining a redundancy quantity N includes calculating the redundancy quantity N according to the following formula:

$$N = INT\left(\log_{LR}^{(1-SR)}\right),$$

where INT( ) is an integral function, LR indicates a packet loss rate, and SR indicates a delay assurance rate.

A third aspect provides a data transmission apparatus, where the apparatus is configured to perform the method in the implementations of the first aspect. Further, the apparatus may include a module configured to perform the method in the implementations of the first aspect.

A fourth aspect provides a data transmission apparatus, where the apparatus is configured to perform the method in the implementations of the second aspect. Further, the apparatus may include a module configured to perform the method in the implementations of the second aspect.

A fifth aspect provides a data transmission apparatus. The apparatus includes a memory and a processor. The memory is configured to store an instruction. The processor is configured to execute the instruction stored in the memory. In addition, the processor executes the instruction stored in the memory to perform the method in the implementations of the first aspect.

A sixth aspect provides a data transmission apparatus. The apparatus includes a memory and a processor. The memory is configured to store an instruction. The processor is configured to execute the instruction stored in the memory. In addition, the processor executes the instruction stored in the memory to perform the method in the implementations of the second aspect.

BRIEF DESCRIPTION OF DRAWINGS

FIG. 3 is a schematic flowchart of a data transmission method according to an embodiment of the present disclosure;

DESCRIPTION OF EMBODIMENTS

The following describes the embodiments of the present disclosure with reference to the accompanying drawings.

A data transmission method and apparatus provided in the embodiments of the present disclosure are applied to a communication scenario that has a relatively high delay requirement.

Figure 1:
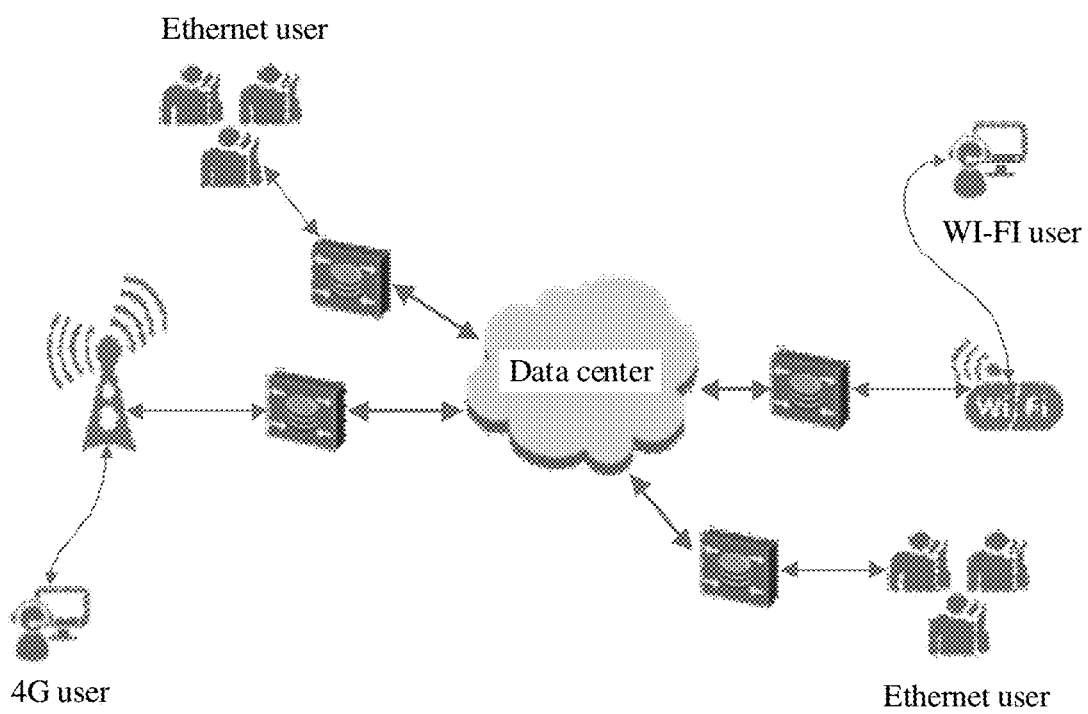
FIG. 1 is a schematic diagram of a scenario according to an embodiment of the present disclosure.

FIG. 1 is an application scenario according to an embodiment of the present disclosure, that is, a schematic diagram of an online multirole-playing game. The game may be defined as a game in which multiple roles collaboratively complete a task. Information about the game is first sent from multiple users (an Ethernet user, a 4G user, and a WI-FI user shown in FIG. 1) to a data center (or a server), and is processed by the data center. Then, the processed information is returned to the users. The information is mostly keyboard or mouse operations from the users. The information is featured by a relatively small data amount and a relatively long data interval, but has a relatively high delay requirement. If a conventional timeout-based retransmission mechanism is used in the scenario shown in FIG. 1, a requirement of a real-time service for TCP delay performance cannot be met.

To resolve a delay problem caused in the timeout-based retransmission mechanism, an FEC technology is provided in the other approaches.

Figure 2:
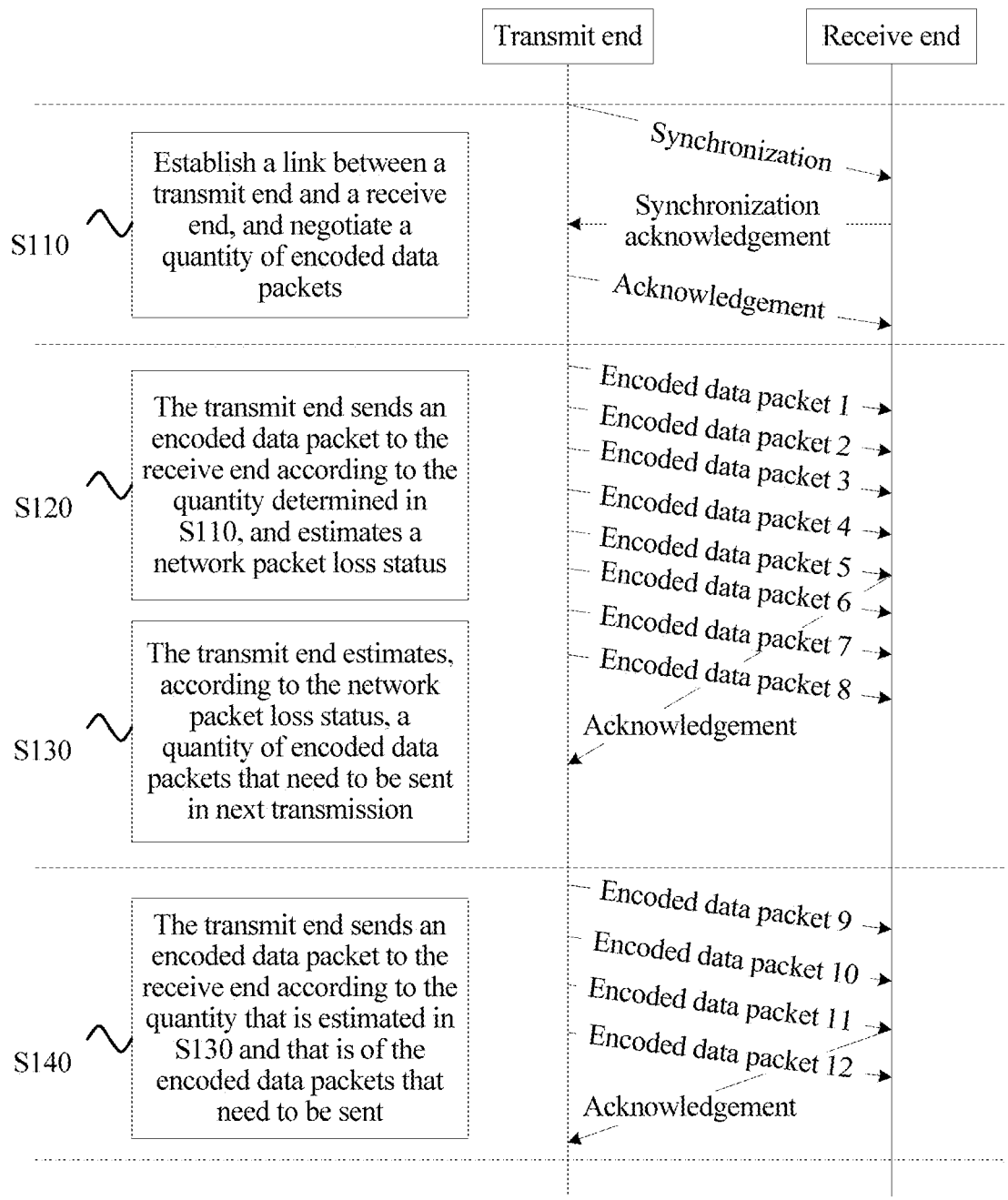
FIG. 2 is a schematic diagram of an existing FEC technology.

FIG. 2 is a schematic diagram of an FEC method in the other approaches. S110. Establish a communication link between a transmit end and a receive end, and negotiate a quantity of encoded data packets. Further, a process of establishing the communication link is as follows. The transmit end sends a synchronization (SYN) message to the receive end, where the SYN message is a handshake signal used for establishing a TCP connection or an Internet Protocol (IP) connection. The receive end sends a SYN ACK message to the transmit end to indicate that the SYN message is received, where the ACK is an acknowledgement. The transmit end further sends an ACK message to the receive end as a response. It should be understood that, only using the foregoing handshaking procedure, a reliable TCP connection can be established between the transmit end and the receive end, and data can be subsequently transmitted between the transmit end and the receive end. For example, the transmit end is a client, and the receive end is a server. S120. The transmit end sends an encoded data packet (encoded data packets 1 to 8 shown in FIG. 2) to the receive end according to the quantity of encoded data packets that is determined by means of negotiation in S110, and estimates a network packet loss status by collecting statistics about a quantity of sent encoded data packets and a quantity of received ACKs. S130. The transmit end calculates, according to the network packet loss status, a quantity of encoded data packets that need to be sent in next transmission. S140. Send an encoded data packet to the receive end according to the quantity of the encoded data packets that is obtained by means of calculation in S130 in order to perform redundancy transmission, and return to S120 to continue to estimate the network packet loss status.

It should be noted that an encoded data packet shown in FIG. 2 is an encoded packet obtained after an native data packet is encoded, and may be considered as a redundant data packet. During each transmission, the native data packet is first sent (not shown in FIG. 2), and then the encoded data packet is sent. Therefore, that the transmit end sends an encoded data packet in FIG. 2 may be considered as transmitting redundant data of original data.

As shown in FIG. 2, in a transmission process corresponding to S120, an ACK corresponding to an encoded data packet 5 is received, and a timeout-based retransmission mechanism does not need to be triggered during this transmission. In another example, in a transmission process corresponding to S140, an ACK corresponding to an encoded data packet 11 is received, and the timeout-based retransmission mechanism does not need to be triggered during this transmission either. Therefore, in an existing FEC technology, redundant data is sent, to reduce a timeout-based retransmission probability, thereby improving TCP delay performance.

However, the FEC technology is prone to unnecessary redundancy transmission, causing unnecessary overheads. As shown in FIG. 2, in the transmission process corresponding to S120, the transmit end receives the ACK corresponding to the encoded data packet 5. It means that the receive end needs to receive only five encoded data packets to successfully decode all native data packets. However, in an actual situation, the transmit end sends eight encoded data packets, and the receive end may successfully receive more than five encoded data packets. The received extra encoded data packets are unnecessary information for a decoding process of the receive end. The transmit end performs unnecessary redundancy transmission, causing unnecessary overheads. For example, unnecessary redundancy transmission occupies an extra network transmission resource. In another example, in the transmission process corresponding to S140, the transmit end receives the ACK corresponding to the encoded data packet 11. Transmission of an encoded data packet 12 by the transmit end is unnecessary redundancy transmission.

Therefore, the existing FEC technology is prone to unnecessary redundancy transmission, increasing unnecessary overheads.

To resolve the foregoing technical problem, the embodiments of the present disclosure provide a data transmission method and apparatus. In comparison with the existing FEC technology, in the embodiments of the present disclosure, not only delay performance is improved, but also unnecessary redundancy transmission is reduced to an extent in order to reduce network overheads.

It should be understood that, in addition to the scenario of the online game shown in FIG. 1, an application scenario of the embodiments of the present disclosure may be another communication scenario that has a relatively high delay requirement, for example, a scenario of Internet of Things real-time message transmission, machine-to-machine real-time communication, keep-alive information interaction between data centers, or robot remote control.

FIG. 3 is a schematic flowchart of a data transmission method 200 according to an embodiment of the present disclosure. The method 200 is performed by a transmit end device (transmit end for short below). The method 200 includes the following steps.

Step S210. Determine a redundancy time according to a delay requirement of a service, where the redundancy time indicates a time used for transmitting redundant data of native data of the service, and the redundancy time is less than or equal to a time indicated by the delay requirement.

Optionally, in an implementation, determining a redundancy time according to a delay requirement of a service includes obtaining a service type of the service, obtaining a delay SLA of the service according to the service type of the service, and determining the redundancy time according to the delay SLA.

Further, for example, the service type of the service is a control command, and the delay SLA of the service may be set to 1000 ms.

Optionally, in an implementation, the determining the redundancy time according to the delay SLA includes calculating the redundancy time according to the delay SLA and a RTT, where the redundancy time is equal to a difference between the delay SLA and the RTT.

Further, for example, when the delay SLA of the service is 200 ms, and the RTT is 50 ms, the redundancy time may be set to 200−50=150 ms.

Optionally, in another implementation, determining the redundancy time according to the delay SLA includes calculating the redundancy time according to the delay SLA and a trusted feedback time, where the redundancy time is equal to a difference between the delay SLA and the trusted feedback time, and the trusted feedback time indicates a time from a time point at which the transmit end sends data to a time point at which corresponding feedback data reaches the transmit end.

Further, for example, when the delay SLA of the service is 1000 ms, and the trusted feedback time is 250 ms, the redundancy time may be set to 1000−250=750 ms.

It should be understood that the trusted feedback time may be obtained by means of estimation by collecting statistics about network status information, or may be obtained by means of empirical value calculation.

Step S220. Determine a redundancy quantity N, where the redundancy quantity N indicates a quantity of times of transmitting the redundant data.

Further, the redundancy quantity N is a quantity of times of transmitting the redundant data of the native data after the native data is sent.

In this embodiment of the present disclosure, the redundancy quantity may be determined using different means according to different network statuses.

In a scenario with a relatively stable network status and a known network status parameter (for example, a scenario of private line transmission between data centers), the redundancy quantity may be calculated by collecting statistics about network status information.

Optionally, in an implementation, the redundancy quantity N is calculated according to the following formula:

$$N = INT(\log_{LR}^{(1-SR)}), \quad (1)$$

where INT( ) is an integral function, LR indicates a packet loss rate, and SR indicates a delay assurance rate.

Further, the packet loss rate LR may be obtained by collecting statistics about the network status information. For example, the packet loss rate LR is calculated by collecting statistics about a quantity of sent data packets and a quantity of received corresponding ACKs.

The delay assurance rate SR is a user requirement parameter. The user may require different delay assurance rates for different services.

If it is assumed that the packet loss rate is 3%, and the delay assurance rate is 99.999%, the redundancy quantity N obtained by means of calculation according to the formula (1) is equal to 3.

In a scenario in which the network status changes relatively fast, and it is difficult to accurately obtain the network status information (for example, a scenario of the Internet of Things), the redundancy quantity may be determined according to the empirical value.

Further, a value of the packet loss rate is estimated according to the empirical value, and then the redundancy quantity is calculated based on the foregoing formula (1) according to the estimated packet loss rate and a delay assurance rate required by the user.

Step S230. Determine N redundancy transmission time intervals according to the redundancy time and the redundancy quantity, where a total time of the N redundancy transmission time intervals is less than or equal to the redundancy time, N is the redundancy quantity, and N is a positive integer.

It should be understood that a redundancy transmission time interval is a time interval used for transmitting the redundant data.

It should be noted that a start moment of a first redundancy transmission time interval in the N redundancy transmission time intervals is a moment at which the transmit end sends the original data.

It should be further noted that, in this embodiment of the present disclosure, none of the N redundancy transmission time intervals is less than a minimum transmission time interval. The minimum transmission time interval is a smallest transmission time interval predefined by a system, or may be referred to as a transmission time interval granularity. For example, the minimum transmission time interval is 20 ms.

For example, when the redundancy time is 150 ms, the redundancy quantity is 3, and the minimum transmission time interval is 20 ms, three determined redundancy transmission time intervals are successively 60 ms, 60 ms, and 30 ms in a time sequence. A start moment of the first redundancy transmission time interval 60 ms is a moment t1 at which the transmit end sends the original data. A moment t2 that is 60 ms after the moment t1 is a moment at which the redundant data is sent for the first time. A moment t3 that is 60 ms after the moment t2 is a moment at which the redundant data is sent for the second time. A moment t4 that is 30 ms after the moment t3 is a moment at which the redundant data is sent for the third time.

Step S240. After the native data of the service is sent, if feedback data is not received within an $n^{th}$ redundancy transmission time interval, send the redundant data of the native data for the $n^{th}$ time according to the $n^{th}$ redundancy transmission time interval, where n is 1, . . . , N, and N is a positive integer.

In this embodiment of the present disclosure, the redundancy time is determined according to the delay requirement of the service, then the redundancy transmission time intervals are determined according to the redundancy time and the redundancy quantity, and the redundant data of the service is further sent according to the determined redundancy transmission time intervals. The redundant data is sent, to reduce a timeout-based retransmission probability, thereby improving TCP delay performance. In addition, the redundancy time is determined according to the delay requirement of the service such that the total time of the redundancy transmission time intervals determined according to the redundancy time and the redundancy quantity falls within a time range corresponding to the delay requirement of the service. In comparison with an existing FEC technology in which a quantity of times and a total time length of redundancy transmission are determined according to only network status information, in this embodiment of the present disclosure, unnecessary redundancy transmission can be reduced to an extent. Therefore, in this embodiment of the present disclosure, not only the TCP delay performance can be improved, but also unnecessary redundancy transmission can be effectively reduced.

Optionally, in the embodiment shown in FIG. 3, steps S210 to S230 may be performed before the native data of the service is sent, or may be performed after the native data of the service is sent. This is not limited in this embodiment of the present disclosure.

Further, in this embodiment of the present disclosure, S210, S220, and S230 are all performed when a transmitting cache of the transmit end is not empty. If the transmitting cache of the transmit end is empty, neither data nor redundant data needs to be sent. Therefore, a redundancy time, a redundancy quantity, and a redundancy transmission time interval do not need to be determined.

It should be further understood that the redundant data in this embodiment of the present disclosure may indicate direct redundancy specific to a piece of native data (a data packet or a packet), or may indicate redundancy obtained after a group of native data (for example, multiple data packets or a group of packets) is processed (for example, encoded, divided, or combined). This is not limited in this embodiment of the present disclosure.

It should be further understood that the packet in this embodiment of the present disclosure may be a data packet, or may be a control packet.

Optionally, in an embodiment, determining N redundancy transmission time intervals according to the redundancy time and the redundancy quantity in step S230 includes determining the N redundancy transmission time intervals according to the redundancy time and the redundancy quantity N, where the N redundancy transmission time intervals include $N_1$ first redundancy transmission time intervals and $N_2$ second redundancy transmission time intervals, the $N_1$ first redundancy transmission time intervals are all greater than the $N_2$ second redundancy transmission time intervals, the $N_1$ first redundancy transmission time intervals are all earlier than the $N_2$ second redundancy transmission time intervals in terms of a time sequence, and a sum of $N_1$ and $N_2$ is equal to N.

That the $N_1$ first redundancy transmission time intervals are all earlier than the $N_2$ second redundancy transmission time intervals in terms of the time sequence means that time points corresponding to the $N_1$ first redundancy transmission time intervals are all prior to time points corresponding to the $N_2$ second redundancy transmission time intervals.

It should be understood that the N redundancy transmission time intervals determined in this embodiment of the present disclosure are featured by being generally arranged from larger to smaller. It should be further understood that a larger redundancy transmission time interval indicates a higher probability of receiving the feedback data. It should be further understood that, in this embodiment of the present disclosure, after the native data of the service is sent, if the feedback data is received within the $n^{th}$ redundancy transmission time interval, transmitting the redundant data of the native data stops being sent, and n is an integer less than N. In this embodiment of the present disclosure, the redundancy transmission time intervals are arranged from larger to smaller such that the feedback data can be received at a relatively high probability within a first, a second, a third, or another redundancy transmission time interval other than a last redundancy transmission time interval of the N redundancy transmission time intervals. Therefore, the redundant data does not need to be sent according to all the redundancy transmission time intervals, to effectively reduce unnecessary redundancy transmission, thereby reducing network overheads.

Optionally, in this embodiment of the present disclosure, there may be a random value relationship among the $N_1$ first redundancy transmission time intervals, and there may be a random value relationship among the $N_2$ second redundancy transmission time intervals.

Further, for example, when the redundancy time is 270 ms, the redundancy quantity is 5, and the minimum transmission time interval is 20 ms, five determined redundancy transmission time intervals are 90 ms, 50 ms, 60 ms, 30 ms, and 40 ms. 90 ms, 50 ms, and 60 ms correspond to the $N_1$ (equal to 3) first redundancy transmission time intervals in this embodiment of the present disclosure, and 30 ms and 40 ms correspond to the $N_2$ (equal to 2) second redundancy transmission time intervals in this embodiment of the present disclosure.

Optionally, in this embodiment of the present disclosure, $N_1$ is equal to 1.

Further, for example, when the redundancy time is 150 ms, the redundancy quantity is 3, and the minimum transmission time interval is 20 ms, three determined redundancy transmission time intervals are 60 ms, 40 ms, and 50 ms. 60 ms corresponds to the $N_1$ (equal to 1) first redundancy transmission time interval in this embodiment of the present disclosure, and 40 ms and 50 ms correspond to the $N_2$ (equal to 2) second redundancy transmission time intervals in this embodiment of the present disclosure.

Optionally, in this embodiment of the present disclosure, the $N_1$ first redundancy transmission time intervals are all no less than a trusted feedback time, and the $N_2$ second redundancy transmission time intervals are all less than the trusted feedback time. The trusted feedback time indicates a time from a time point at which the transmit end sends data to a time point at which feedback data corresponding to the data is received by the transmit end.

It should be understood that, if the transmit end sends data to a receive end at the moment t1, and receives, at the moment t2, corresponding feedback data sent by the receive end, the trusted feedback time may be set to (t2−t1).

Further, for example, when the redundancy time is 200 ms, the redundancy quantity is 4, the trusted feedback time is 60 ms, and the minimum transmission time interval is 20 ms, four determined redundancy transmission time intervals are 60 ms, 70 ms, 30 ms, and 40 ms. The two time intervals of 60 ms and 70 ms correspond to the $N_1$ (equal to 2) first redundancy transmission time intervals in this embodiment of the present disclosure, and two time intervals of 30 ms and 40 ms correspond to the $N_2$ (equal to 2) second redundancy transmission time intervals in this embodiment of the present disclosure.

Further, the trusted feedback time may be obtained by collecting statistics about the network status information.

It should be understood that, when a redundancy transmission time interval is no less than the trusted feedback time, the feedback data can be received at a relatively high probability within the redundancy transmission time interval. Therefore, in this embodiment of the present disclosure, unnecessary redundancy transmission can be effectively reduced.

Optionally, in this embodiment of the present disclosure, $N_2$ is equal to 1, and the $N_1$ first redundancy transmission time intervals are all equal to the trusted feedback time.

Further, for example, when the redundancy time is 150 ms, the redundancy quantity is 3, the trusted feedback time is 60 ms, and the minimum transmission time interval is 20 ms, three determined redundancy transmission time intervals are 60 ms, 60 ms, and 30 ms. The two time intervals of 60 ms and 60 ms correspond to the $N_1$ (equal to 2) first redundancy transmission time intervals in this embodiment of the present disclosure, and 30 ms corresponds to the $N_2$ (equal to 1) second redundancy transmission time interval in this embodiment of the present disclosure.

Optionally, in this embodiment of the present disclosure, if the redundancy time is sufficient, each transmitting of the N redundancy transmission time intervals is greater than the trusted feedback time.

Further, for example, when the redundancy time is 210 ms, the redundancy quantity is 3, the trusted feedback time is 60 ms, and the minimum transmission time interval is 20 ms, three determined redundancy transmission time intervals are 70 ms, 80 ms, and 60 ms. The two time intervals of 70 ms and 80 ms correspond to the $N_1$ (equal to 2) first redundancy transmission time intervals in this embodiment of the present disclosure, and 60 ms corresponds to the $N_2$ (equal to 1) second redundancy transmission time interval in this embodiment of the present disclosure.

Optionally, in this embodiment of the present disclosure, the determining N redundancy transmission time intervals according to the redundancy time and the redundancy quantity in step S230 includes determining the N redundancy transmission time intervals according to the redundancy time and the redundancy quantity based on any one or a combination of the following methods random collision, formula calculation, or program building.

Optionally, in this embodiment of the present disclosure, the determining N redundancy transmission time intervals according to the redundancy time and the redundancy quantity in step S230 includes determining the $n^{th}$ redundancy transmission time interval $T_p(n)$ according to the following formula:

$$T_p(n) = \text{MAX}\left(T_t \cdot \frac{2^{N-n}}{2^N - 1}, TTI_{min}\right), \quad (2)$$

where MAX( ) indicates a function for obtaining a maximum value, $T_t$ indicates the redundancy time, n is 1, ..., N, and $TTI_{min}$ indicates the minimum transmission time interval, for example, 20 ms.

Therefore, in this embodiment of the present disclosure, the N determined redundancy transmission time intervals are featured by being generally arranged from larger to smaller such that the feedback data can be received at a relatively high probability within a first, a second, a third, or another redundancy transmission time interval other than a last redundancy transmission time interval of the N redundancy transmission time intervals. Therefore, the redundant data does not need to be sent according to all the redundancy transmission time intervals, to effectively reduce unnecessary redundancy transmission, thereby reducing network overheads.

It can be learned from the foregoing description that the steps S210 to S230 in the embodiment shown in FIG. 3 may be considered as a process of scheduling the redundant data. In an actual transmitting process, the redundant data is not sent according to all the redundancy transmission time intervals determined in step S230.

Figure 4A:
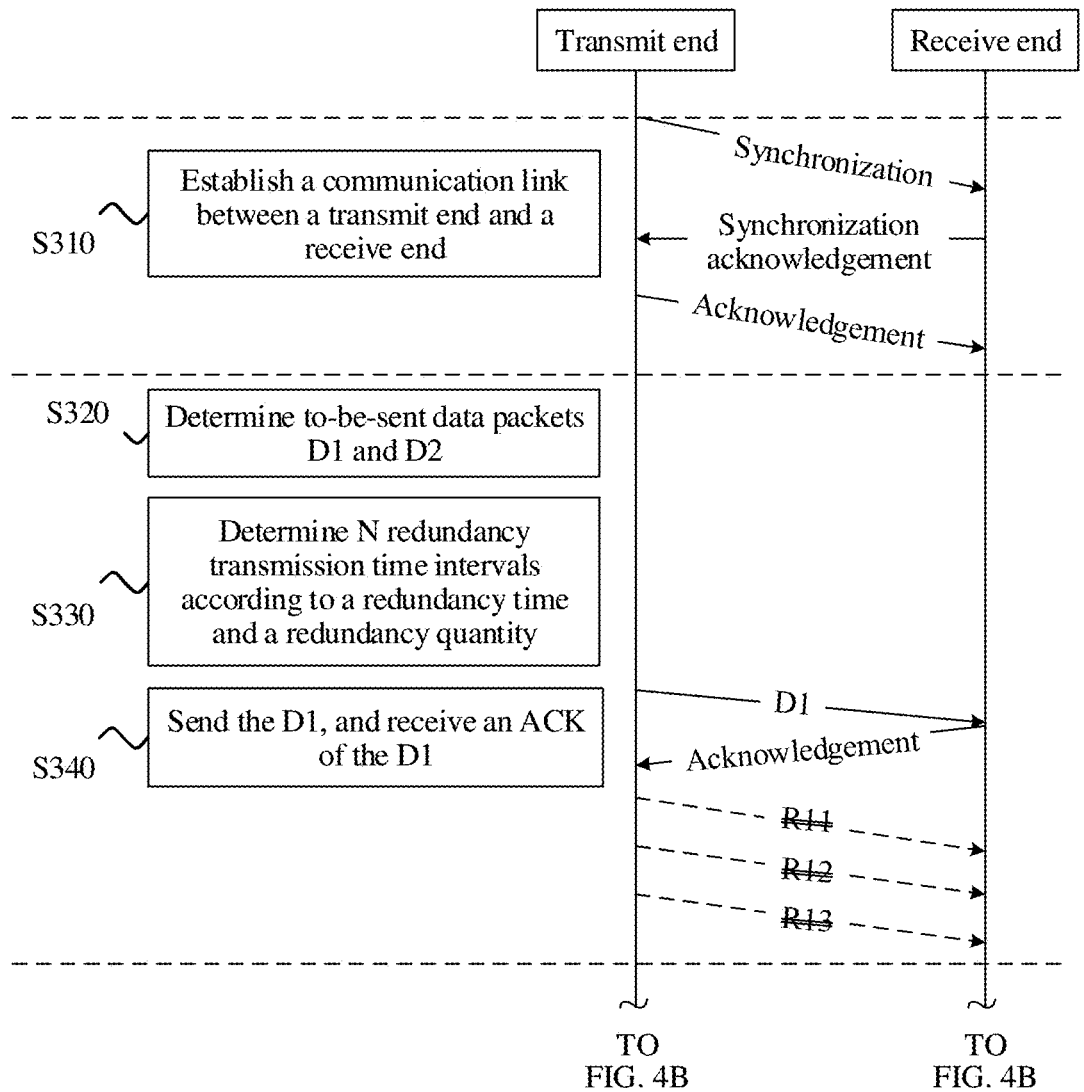
FIG. 4A and FIG. 4B are another schematic flowchart of a data transmission method according to an embodiment of the present disclosure.
Figure 4B:
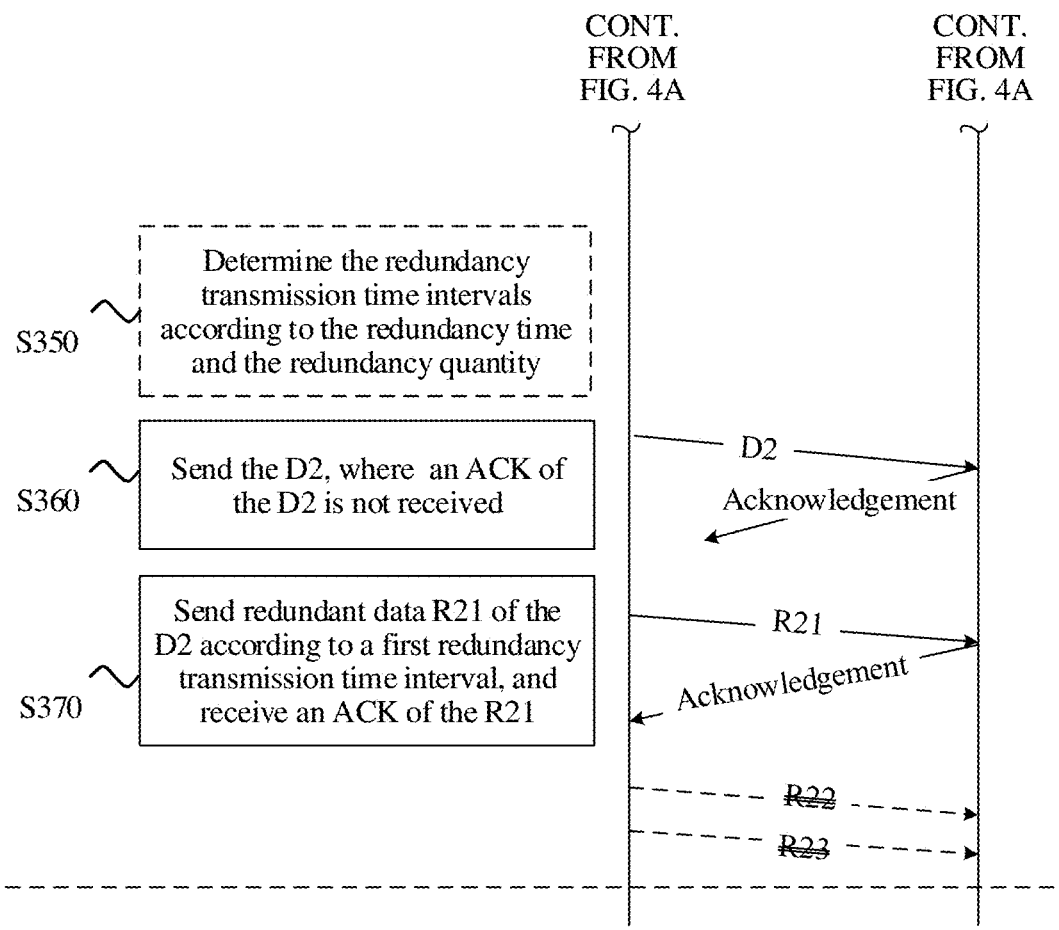

FIG. 4A and FIG. 4B are another schematic flowchart of a data transmission method according to an embodiment of the present disclosure.

Step S310. Establish a communication link (that is, a TCP connection) between a transmit end and a receive end.

Further, a process of establishing the communication link is as follows The transmit end sends a SYN message to the receive end, where the SYN message is a handshake signal used for establishing a TCP connection or an IP connection. The receive end sends a SYN ACK message to the transmit end, to indicate that the SYN message is received, where the ACK is an acknowledgement. The transmit end further sends an ACK message to the receive end as a response. It should be understood that, only using the foregoing handshaking procedure, a reliable TCP connection can be established between the transmit end and the receive end, and data can be subsequently transmitted between the transmit end and the receive end. For example, the transmit end is a client, and the receive end is a server.

Step S320. Before transmitting data, the transmit end learns that a service type of to-be-sent data is a control message, and the transmission end needs to send two control messages. A data packet D1 and a data packet D2 are used as an example.

Step S330. The transmit end determines N redundancy transmission time intervals according to a redundancy time and a redundancy quantity, where the N redundancy transmission time intervals include $N_1$ first redundancy transmission time intervals and $N_2$ second redundancy transmission time intervals, the $N_1$ first redundancy transmission time intervals are all greater than the $N_2$ second redundancy transmission time intervals, the $N_1$ first redundancy transmission time intervals are all earlier than the $N_2$ second redundancy transmission time intervals in terms of a time sequence, and a sum of $N_1$ and $N_2$ is equal to N. For detailed descriptions of the $N_1$ first redundancy transmission time intervals and the $N_2$ second redundancy transmission time intervals, refer to the foregoing description. For brevity, details are not described herein again.

Further, for example, when the redundancy time is 120 ms, the redundancy quantity is 3, and a minimum transmission time interval is 20 ms, three determined redundancy transmission time intervals are 60 ms, 40 ms, and 20 ms.

Step S340. The transmit end sends the first data packet D1 to the receive end, and receives an ACK of the data packet D1 within a first redundancy transmission time interval (for example, 60 ms). That is, the receive end successfully acknowledges that the data packet D1 is correctly received.

In this case, the transmit end does not need to send redundant data of the data packet D1 according to the redundancy transmission time intervals determined in step S330. Further, as shown in FIG. 4A and FIG. 4B, redundant data packets R11, R12, and R13 of the data packet D1 do not need to be sent according to three redundancy transmission time intervals determined in step S330.

Step S350. The transmit end determines the redundancy transmission time intervals according to the redundancy time and the redundancy quantity.

Further, for example, when the redundancy time is 120 ms, the redundancy quantity is 3, and a minimum transmission time interval is 20 ms, three determined redundancy transmission time intervals are 60 ms, 40 ms, and 20 ms.

Step S360. The transmit end continues to send the second data packet D2 to the receive end, and does not receive, within the first redundancy transmission time interval (60 ms), an ACK sent by the receive end transmitting.

Step S370. The transmit end sends a redundant data packet R21 of D2 at a moment after the first redundancy transmitting time interval (60 ms) determined in step S350 passes after the data packet D2 is sent, and receives an ACK of the redundant data packet R21 within a second redundancy transmission time interval (40 ms).

In this case, the transmit end does not need to send redundant data packets R22 and R23 of the data packet D2 according to the second redundancy transmission time interval and a third redundancy transmission time interval.

Therefore, in this embodiment of the present disclosure, the redundancy transmission time intervals are featured by being arranged from larger to smaller feature such that the feedback data can be received at a relatively high probability within a first, a second, a third, or another redundancy transmission time interval other than a last redundancy transmission time interval of the N redundancy transmission time intervals. Therefore, the redundant data does not need to be sent according to all the redundancy transmission time intervals such that unnecessary redundancy transmission can be effectively reduced.

It should be understood that, in the embodiment shown in FIG. 4A and FIG. 4B, step S330 may be performed before the data packet D1 is sent, or may be performed at a same moment at which the data packet D1 is sent, or may be performed after the data packet D1 is sent. This is not limited in this embodiment of the present disclosure. Certainly, step S330 is performed before transmitting the redundant data is sent.

It should be further understood that step S350 and step S330 are same steps.

Further, in a process of transmitting the data packet D2, a redundancy transmission time interval does not need to be redetermined, and a result of determining in step S330 may be directly used. That is, step S350 may be omitted.

Optionally, step S350 may be a step different from step 330.

Further, in a process of transmitting the data packet D2, a redundancy transmission time interval of the data packet D2 may be redetermined according to current network status information. That is, in this embodiment of the present disclosure, the redundancy quantity and the redundancy transmission time interval may be dynamically adjusted at any moment after redundancy transmission starts.

Further, in the embodiment shown in FIG. 3, if feedback data of the native data is not received within a first redundancy transmission time interval of the N redundancy transmission time intervals, the redundant data of the native data is sent for the first time according to the first redundancy transmission time interval. If feedback data of the redundant data sent for the first time is not received within a second redundancy transmission time interval, the redundant data of the native data is sent for the second time according to the second redundancy transmission time interval. If feedback data of the redundant data sent for the second time is not received within a third redundancy transmission time interval, the redundant data of the native data is sent for the third time according to the third redundancy transmission time interval, and so on, until feedback data of the redundant data is received or the redundancy transmission time intervals determined in S230 are all used. Optionally, in this embodiment of the present disclosure, if the feedback data of the redundant data sent for the second time is not received within the third redundancy transmission time interval, the redundancy quantity is increased by INT (N/2). Further, a time interval corresponding to an added redundancy quantity may be a minimum transmission time interval.

Optionally, in the embodiment shown in FIG. 3, the method further includes that in a process of transmitting the redundant data of the native data for an $n^{th}$ time according to an $n^{th}$ redundancy transmission time interval, collecting statistics about network status information, and updating the redundancy quantity and the redundancy transmission time interval according to latest obtained network status information, where the network status information includes a packet loss rate and an RTT.

Optionally, in the embodiment shown in FIG. 3, in step S240, the redundant data may be sent according to the N redundancy transmission time intervals determined in step S230, or the redundancy quantity and the redundancy transmission time interval may be dynamically adjusted in a process of transmitting the redundant data. Further, the redundancy quantity and the redundancy transmission time interval may be dynamically determined respectively according to means in steps S220 and S230. For specific content, refer to the foregoing related descriptions. For brevity, details are not described herein again.

Figure 5:
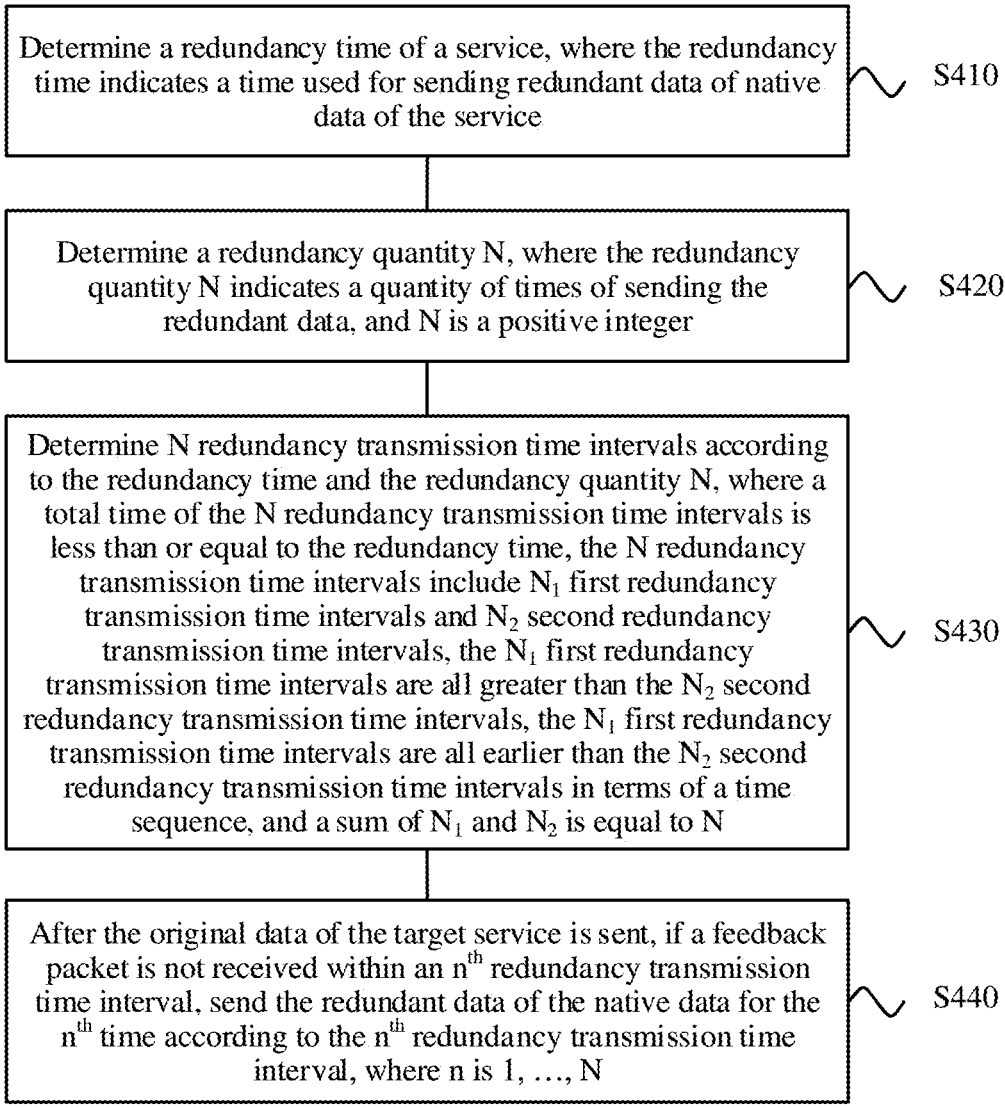
FIG. 5 is still another schematic flowchart of a data transmission method according to an embodiment of the present disclosure.

FIG. 5 is a schematic flowchart of a data transmission method 400 according to another embodiment of the present disclosure. The method 400 may be performed by a transmit end device. The method 400 includes the following steps.

Step S410. Determine a redundancy time of a service, where the redundancy time indicates a time used for transmitting redundant data of native data of the service.

It should be understood that step S410 includes, but is not limited to determining the redundancy time according to a delay requirement of a service.

Step S420. Determine a redundancy quantity N, where the redundancy quantity N indicates a quantity of times of transmitting the redundant data, and N is a positive integer.

For specific descriptions, refer to the description in step S220, and details are not described herein again.

Step S430. Determine N redundancy transmission time intervals according to the redundancy time and the redundancy quantity, where a total time of the N redundancy transmission time intervals is less than or equal to the redundancy time, the N redundancy transmission time intervals include $N_1$ first redundancy transmission time intervals and $N_2$ second redundancy transmission time intervals, the $N_1$ first redundancy transmission time intervals are all greater than the $N_2$ second redundancy transmission time intervals, the $N_1$ first redundancy transmission time intervals are all earlier than the $N_2$ second redundancy transmission time intervals in terms of a time sequence, and a sum of $N_1$ and $N_2$ is equal to N.

For specific descriptions, refer to the foregoing description of the N redundancy transmission time intervals. Details are not described herein again.

Step S440. After the native data of the service is sent, if feedback data is not received within an $n^{th}$ redundancy transmission time interval, send the redundant data of the native data for the $n^{th}$ time according to the $n^{th}$ redundancy transmission time interval, where n is 1, . . . , or N.

For specific descriptions, refer to the foregoing description. Details are not described herein again.

In this embodiment of the present disclosure, the redundant data is sent, to reduce a timeout-based retransmission probability, thereby improving TCP delay performance. In addition, in this solution, the N determined redundancy transmission time intervals are arranged from larger to smaller such that a probability of receiving the feedback data (for example, an ACK) within a first, a second, or a redundancy transmission time interval other than a last redundancy transmission time interval can be increased. It should be understood that, after the native data of the service is sent, if the feedback data is received within the $n^{th}$ redundancy transmission time interval, transmitting the redundant data of the native data stops being sent. In this case, the redundant data does not need to be sent according to remaining redundancy transmission time intervals, and n is less than N. Therefore, unnecessary redundancy transmission can be effectively reduced. Therefore, in this embodiment of the present disclosure, not only the TCP delay performance can be improved, but also unnecessary redundancy transmission can be effectively reduced.

Optionally, in this embodiment of the present disclosure, the method 400 further includes, after the native data of the service is sent, if the feedback data is received within the $n^{th}$ redundancy transmission time interval, stop transmitting the redundant data of the original data.

For specific descriptions, refer to the foregoing description. Details are not described herein again.

Optionally, in this embodiment of the present disclosure, the $N_1$ first redundancy transmission time intervals are all no less than a trusted feedback time, and the $N_2$ second redundancy transmission time intervals are all less than the trusted feedback time. The trusted feedback time indicates a time from a time point at which the transmit end sends data to a time point at which feedback data corresponding to the data is received by the transmit end.

For specific descriptions, refer to the foregoing description. Details are not described herein again.

Optionally, in this embodiment of the present disclosure, $N_2$ is equal to 1, and the $N_1$ first redundancy transmission time intervals are all equal to the trusted feedback time.

For specific descriptions, refer to the foregoing description. Details are not described herein again.

Optionally, in this embodiment of the present disclosure, determining N redundancy transmission time intervals according to the redundancy time and the redundancy quantity includes determining the $n^{th}$ redundancy transmission time interval $T_p(n)$ according to the foregoing shown formula (2). For specific descriptions, refer to the foregoing description. Details are not described herein again.

The data transmission method in this embodiment of the present disclosure is not only applicable to a scenario in which a network status changes relatively fast, and it is difficult to obtain network status information, for example, the Internet of Things, but also applicable to a scenario with a relatively stable network status and a known network status parameter, for example, a scenario of private line transmission between data centers. In an example of the two scenarios, the following separately describes the method in this embodiment of the present disclosure.

Scenario 1: The network status changes relatively fast, and it is difficult to accurately obtain the network status information.

In this scenario, a wireless network is mixed with a wired network, and the networks are even multinational and run by different operators. Therefore, network statuses are greatly different from each other, and change relatively fast. For example, in a physical network, a data volume is generally relatively small. Therefore, it is more difficult to obtain the network status information.

A basic procedure in which the method in this embodiment of the present disclosure is applied to scenario 1 is as follows.

It is assumed that a transmitting cache of the transmit end is not empty.

510. The transmit end determines a redundancy time according to an imprecise estimation of network status information.

Further, the transmit end determines that a service type of to-be-sent data is a control command, and sets a delay SLA of the to-be-sent data to 1000 ms. The transmit end sets the redundancy time to $T_t=1000-\Delta$ according to the imprecise estimation of the network status information, and $\Delta$ may indicate the trusted feedback time. In this scenario, the trusted feedback time is an empirical value. For example, it is learned according to the empirical value that the trusted feedback time $\Delta$ is 250 ms. Therefore, the redundancy time $T_t=1000-\Delta=1000-250=750$ ms.

520. The transmit end determines a redundancy quantity according to the imprecise estimation of the network status information.

Further, for example, the transmit end obtains a packet loss rate LR by means of estimation according to the imprecise estimation of the network status information, and calculates the redundancy quantity N according to the foregoing formula (1) based on a delay assurance rate SR required by a user. For example, the obtained redundancy quantity N is 6.

530. The transmit end calculates redundancy transmission time intervals according to the redundancy time $T_t$ and the redundancy quantity N using a "negative exponent periodical scheduling policy without considering a network status" transmitting.

It should be understood that the "negative exponent periodical scheduling policy without considering a network status" is a policy in which the redundancy transmission time intervals are set to a decreasing geometric progression. The "negative exponent periodical scheduling policy without considering a network status" is shown in the following formula:

$$T_p(n) = \text{MAX}\left(T_t \cdot \frac{a(n)}{S}, TTI_{min}\right) \quad (3)$$

$$S = \frac{1-b^N}{1-b}$$

$$a(n) = b^{N-n},$$

where MAX( ) indicates a function for obtaining a maximum value, $T_t$ is the redundancy time, N is the redundancy quantity, n is 1, ..., N, $TTI_{min}$ is a minimum transmission time interval, 1/b is a common ratio of the geometric progression, b>1, $$S = \frac{1-b^N}{1-b}$$

indicates that $T_t$ is quantized to S time units, $a(n)=b^{(N-n)}$ indicates that the $n^{th}$ redundancy transmission time interval includes a(n) time units, $$\frac{a(n)}{S}$$

indicates a time ratio of the $n^{th}$ redundancy transmission time interval, and $$T_t \cdot \frac{a(n)}{S}$$

indicates a time interval between the $n^{th}$ time of the redundant data transmission and the $(n-1)^{th}$ time of the redundant data transmission when the redundancy time is $T_t$.

It should be understood that, when a value of n is 1, the $(n-1)^{th}$ time of the redundant data transmission is the $0^{th}$ time of the redundant data transmission. The $0^{th}$ time of the redundant data transmission is transmitting the native data corresponding to the redundant data, and is not transmitting the redundant data.

Further, a value of b may be 2. Therefore, a calculation formula (that is, the foregoing formula (2)) of the time interval $T_p(n)$ (that is, the $n^{th}$ redundancy transmission time interval) between the $n^{th}$ time of the redundant data transmission and the $(n-1)^{th}$ time of the redundant data transmission is:

$$T_p(n) = \text{MAX}\left(T_t \cdot \frac{2^{N-n}}{2^N - 1}, TTI_{min}\right).$$

It should be understood that an example in which the value of b is 2 is used for description in the foregoing embodiment, and this is not limited in this embodiment of the present disclosure. In an actual application, the value of b may be appropriately considered according to a specific requirement.

540. After native data is sent, if feedback data is not received within an $n^{th}$ redundancy transmission time interval, the transmit end sends redundant data of the native data for the $n^{th}$ time according to the $n^{th}$ redundancy transmission time interval.

Further, for example, if feedback data of the native data is not received within a first redundancy transmission time interval, the redundant data of the native data is sent for the first time according to the first redundancy transmission time interval. If feedback data of the redundant data sent for the first time is not received within a second redundancy transmission time interval, the redundant data of the native data is sent for the second time according to the second redundancy transmission time interval. If feedback data of the redundant data sent for the second time is not received within a third redundancy transmission time interval, the redundant data of the native data is sent for the third time according to the third redundancy transmission time interval, and so on, until the value of n is N (in this embodiment, the value is 6).

It should be understood that, if the feedback data is received within the $n^{th}$ redundancy transmission time interval, transmitting the redundant data of the native data stops being sent.

550. If the transmit end detects that, in 540, after the redundant data is sent for the second time, a corresponding ACK is not received within a third redundancy transmission time interval, increase the redundancy quantity by INT(N/2) (increased by three in this embodiment), and recalculate all remaining redundancy transmission time intervals. A calculation principle is still the "negative exponent periodical scheduling policy without considering a network status".

It should be noted that all the remaining redundancy transmission time intervals include remaining redundancy transmission time intervals other than a first and a second redundancy transmission time intervals in the previous N redundancy transmission time intervals, and INT (N/2) redundancy transmission time intervals corresponding to the newly added redundancy quantity INT (N/2).

560. In a process of transmitting the redundant data in 540, the transmit end imprecisely estimates the network status according to a status of data (the native data and/or the redundant data) transmission and feedback data receiving, and return to 510.

Scenario 2: The network status is relatively stable, and the network status information can be learned.

It is assumed that obtained service status information is as follows. An RTT is 50 ms, the RTT ranges from 40 ms to 60 ms, the packet loss rate is less than 3%, a packet loss mode is a combination of a random packet loss and a continuous packet loss, the trusted feedback time is 60 ms, and a minimum time interval threshold is 20 ms. A delay SLA of the service is 200 ms, and a delay assurance rate is 99.999%. If it is assumed that the transmit end always needs to send a data packet, the transmitting cache of the transmit end is not empty.

A basic procedure in which the method in this embodiment of the present disclosure is applied to scenario 2 is as follows.

610. The transmit end determines a redundancy time according to a delay SLA and an RTT of a service.

Further, the redundancy time is set to a value obtained by subtracting the RTT from the delay SLA, that is, 200−50=150 ms.

It should be understood that, in this embodiment, the redundancy time is set to 150 ms such that the last time of redundancy transmission can have enough time to be acknowledged at a relatively high probability within the delay SLA of the service.

620. Determine a redundancy quantity N according to a packet loss rate and a delay assurance rate.

Further, the packet loss rate LR 3% and the delay assurance rate SR 99.999% are substituted into the foregoing shown formula (1), and the redundancy quantity N obtained by means of calculation is 3.

630. Determine redundancy transmission time intervals according to the redundancy time determined in 610 and the redundancy quantity N determined in 620.

Further, the network status information is known. Therefore, the transmit end uses an optimal redundancy scheduling algorithm to obtain corresponding redundancy transmission time intervals, 60 ms, 60 ms, and 30 ms.

The optimal redundancy scheduling algorithm may be a method for determining the N redundancy transmission time intervals described in the foregoing embodiment. For specific descriptions, refer to the foregoing description. Details are not described herein again.

640. Send redundant data according to the N (a value of N is 3 in this embodiment) redundancy transmission time intervals determined in 630.

Further, after native data is sent, if feedback data is not received within an $n^{th}$ redundancy transmission time interval, the transmit end sends redundant data of the native data for the $n^{th}$ time according to the $n^{th}$ redundancy transmission time interval, where n is 1, . . . , N.

It should be understood that, if the feedback data is received within the $n^{th}$ redundancy transmission time interval, transmitting the redundant data of the native data stops being sent.

650. If the transmit end detects that, in 640, after the redundant data is sent for the second time, a corresponding ACK is not received within a third redundancy transmission time interval, it is considered that a network is in a continuous packet loss status, and the redundancy quantity is temporarily increased by three.

Further, three redundancy transmission time intervals corresponding to the newly added redundancy quantity are all 20 ms. The three newly added redundancy transmission time intervals are placed after a last scheduled redundancy transmission time interval.

660. In a process of transmitting the redundant data in 640, the transmit end precisely collects statistics about the network status information according to a status of data (native data and/or the redundant data) transmission and feedback data receiving, and return to 610.

In conclusion, in comparison with an existing FEC technology, unnecessary redundancy transmission can be reduced according to the data transmission method in this embodiment of the present disclosure.

It should be understood that, the transmit end related to this embodiment of the present disclosure may be, for example, a client, and a receive end may be, for example, a server.

The foregoing describes the data transmission method in embodiments of the present disclosure, and the following describes a data transmission apparatus in the embodiments of the present disclosure.

Figure 6:
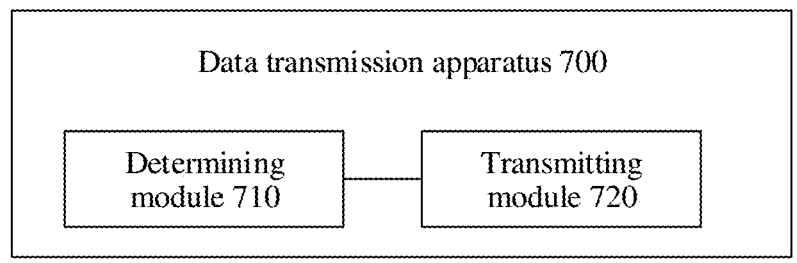
FIG. 6 is a schematic block diagram of a data transmission apparatus according to an embodiment of the present disclosure.

FIG. 6 is a schematic block diagram of a data transmission apparatus 700 according to an embodiment of the present disclosure. The apparatus 700 includes a determining module 710 and a transmitting module 720.

The determining module 710 is configured to determine a redundancy time according to a delay requirement of a service, where the redundancy time indicates a time used for transmitting redundant data of native data of the service, and the redundancy time is less than or equal to a time indicated by the delay requirement. The determining module 710 is further configured to determine a redundancy quantity N, where the redundancy quantity N indicates a quantity of times of transmitting the redundant data, and N is a positive integer. The determining module 710 is further configured to determine N redundancy transmission time intervals according to the redundancy time and the redundancy quantity, where a total time of the N redundancy transmission time intervals is less than or equal to the redundancy time. The transmitting module 720 is configured to, after the native data of the service is sent, if feedback data is not received within an $n^{th}$ redundancy transmission time interval, send the redundant data of the native data for the $n^{th}$ time according to the $n^{th}$ redundancy transmission time interval, where n is 1, . . . , or N.

According to the data transmission apparatus 700 in this embodiment of the present disclosure, unnecessary redundancy transmission can be effectively reduced.

Optionally, in this embodiment of the present disclosure, the determining module 710 is configured to determine the N redundancy transmission time intervals according to the redundancy time and the redundancy quantity, where the N redundancy transmission time intervals include $N_1$ first redundancy transmission time intervals and $N_2$ second redundancy transmission time intervals, the $N_1$ first redundancy transmission time intervals are all greater than the $N_2$ second redundancy transmission time intervals, the $N_1$ first redundancy transmission time intervals are all earlier than the $N_2$ second redundancy transmission time intervals in terms of a time sequence, and a sum of $N_1$ and $N_2$ is equal to N.

Optionally, in this embodiment of the present disclosure, the $N_1$ first redundancy transmission time intervals are all no less than a trusted feedback time, the $N_2$ second redundancy transmission time intervals are all less than the trusted feedback time, and the trusted feedback time indicates a time from a time point at which a transmit end sends data to a time point at which feedback data corresponding to the data is received by the transmit end.

Optionally, in this embodiment of the present disclosure, $N_2$ is equal to 1, and the $N_1$ first redundancy transmission time intervals are all equal to the trusted feedback time.

Optionally, in this embodiment of the present disclosure, the determining module 710 is configured to determine the $n^{th}$ redundancy transmission time interval $T_P(n)$ according to the following formula:

$$T_P(n) = \mathrm{MAX}\left(T_t \cdot \frac{2^{N-n}}{2^N - 1}, TTI_{min}\right),$$

where MAX( ) indicates a function for obtaining a maximum value, $T_t$ indicates the redundancy time, n is 1, . . . , N, and $TTI^{min}$ indicates a minimum transmitting time interval.

Optionally, in this embodiment of the present disclosure, the transmitting module 720 is further configured to, after the native data of the service is sent, if the feedback data is received within the $n^{th}$ redundancy transmission time interval, stop transmitting the redundant data of the original data.

Optionally, in this embodiment of the present disclosure, the determining module 710 is configured to calculate the redundancy quantity N according to the following formula:

$$N = INT\left(\log_{LR}^{(1-SR)}\right),$$

where INT( ) is an integral function, LR indicates a packet loss rate, and SR indicates a delay assurance rate.

It should be understood that the apparatus 700 in this embodiment of the present disclosure is implemented in a form of a functional unit. In an optional embodiment, a person skilled in the art may understand that the apparatus 700 may be corresponding to the transmit end in the data transmission method in the embodiment of the present disclosure, and may be configured to perform a corresponding procedure and/or step in the data transmission method in the foregoing embodiments of the present disclosure. To avoid repetition, details are not described herein.

Further, in this embodiment of the present disclosure, the determining module 710 may be implemented by a processor, and the transmitting module 720 may be implemented by a transmitter.

Figure 7:
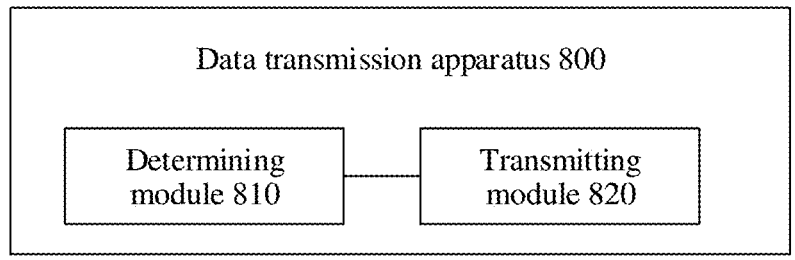
FIG. 7 is another schematic block diagram of a data transmission apparatus according to an embodiment of the present disclosure.

FIG. 7 is a schematic block diagram of a data transmission apparatus 800 according to an embodiment of the present disclosure. The apparatus 800 includes a determining module 810 and a transmitting module 820.

The determining module 810 is configured to determine a redundancy time of a service, where the redundancy time indicates a time used for transmitting redundant data of native data of the service. The determining module 810 is further configured to determine a redundancy quantity N, where the redundancy quantity N indicates a quantity of times of transmitting the redundant data, and N is a positive integer. The determining module 810 is further configured to determine N redundancy transmission time intervals according to the redundancy time and the redundancy quantity, where a total time of the N redundancy transmission time intervals is less than or equal to the redundancy time, the N redundancy transmission time intervals include $N_1$ first redundancy transmission time intervals and $N_2$ second redundancy transmission time intervals, the $N_1$ first redundancy transmission time intervals are all greater than the $N_2$ second redundancy transmission time intervals, the $N_1$ first redundancy transmission time intervals are all earlier than the $N_2$ second redundancy transmission time intervals in terms of a time sequence, and a sum of $N_1$ and $N_2$ is equal to N. The transmitting module 820 is configured to, after the native data of the service is sent, if feedback data is not received within an $n^{th}$ redundancy transmission time interval, send the redundant data of the native data for the $n^{th}$ time according to the $n^{th}$ redundancy transmission time interval, where n is 1, . . . , or N.

According to the data transmission apparatus 800 in this embodiment of the present disclosure, unnecessary redundancy transmission can be effectively reduced.

Optionally, in this embodiment of the present disclosure, the $N_1$ first redundancy transmission time intervals are all no less than a trusted feedback time, and the $N_2$ second redundancy transmission time intervals are all less than the trusted feedback time. The trusted feedback time indicates a time from a time point at which a transmit end sends data to a time point at which feedback data corresponding to the data is received by the transmit end.

Optionally, in this embodiment of the present disclosure, $N_2$ is equal to 1, and the $N_1$ first redundancy transmission time intervals are all equal to the trusted feedback time.

Optionally, in this embodiment of the present disclosure, the determining module 810 is configured to determine the $n^{th}$ redundancy transmission time interval $T_p(n)$ according to the following formula:

$$T_p(n) = \text{MAX}\left(T_t \cdot \frac{2^{N-n}}{2^N - 1}, TTI_{min}\right),$$

where MAX( ) indicates a function for obtaining a maximum value, $T_t$ indicates the redundancy time, n is 1, . . . , N, and $TTI_{min}$ and indicates a minimum transmitting time interval.

Optionally, in this embodiment of the present disclosure, the transmitting module 820 is further configured to, after the native data of the service is sent, if the feedback data is received within the $n^{th}$ redundancy transmission time interval, stop transmitting the redundant data of the original data.

It should be understood that the apparatus 800 in this embodiment of the present disclosure is implemented in a form of a functional unit. In an optional embodiment, a person skilled in the art may understand that the apparatus 800 may be corresponding to the transmit end in the data transmission method in the embodiment of the present disclosure, and may be configured to perform a corresponding procedure and/or step in the data transmission method in the foregoing embodiments of the present disclosure. To avoid repetition, details are not described herein.

Further, in this embodiment of the present disclosure, the determining module 810 may be implemented by a processor, and the transmitting module 820 may be implemented by a transmitter.

Figure 8:
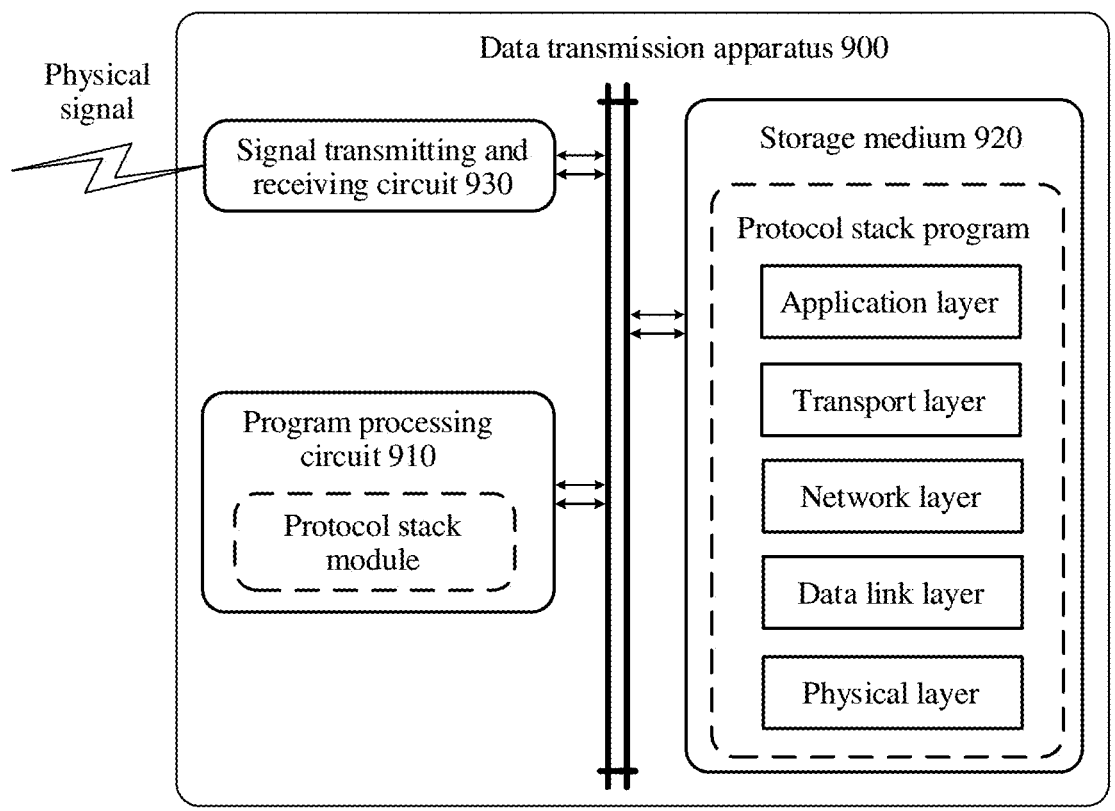
FIG. 8 is still another schematic block diagram of a data transmission apparatus according to an embodiment of the present disclosure.

FIG. 8 is a schematic block diagram of a data transmission apparatus 900 according to an embodiment of the present disclosure. The apparatus 900 may be corresponding to the transmit end in the data transmission method in the embodiment of the present disclosure, and may be corresponding to the data transmission apparatus 700 and the data transmission apparatus 800 in the embodiments of the present disclosure. The apparatus 900 includes a program processing circuit 910, a storage medium 920, and a signal transmitting and receiving circuit 930. The storage medium 920 is configured to store a program or an instruction. The program processing circuit 910 is configured to execute the program or the instruction stored in the storage medium 920. The program processing circuit 910 executes the program or the instruction stored in the storage medium 920 to perform the corresponding procedure in the data transmission method in the foregoing embodiments of the present disclosure. For brevity, details are not described herein.

The program processing circuit 910 is configured to process digital information. The signal transmitting and receiving circuit 930 is configured to transmit and receive a physical signal. The storage medium 920 is configured to store data and a program in an information processing process. The storage medium 920 may be integrated into or independent of the program processing circuit 910 and/or the signal transmitting and receiving circuit 930.

The program processing circuit 910 may be implemented in one or more structures used for executing a program. A specific function is data processing and/or data transmitting, data storage and access control, and the like.

Further, the program processing circuit 910 includes, but is not limited to a field programmable gate array (FPGA), a digital signal processor (DSP), a central purpose processor (CPU), an application-specific integrated circuit (ASIC), or another programmable logic device.

The signal transmitting and receiving circuit 930 is configured to support a physical signal between a network element and one or more network elements.

The signal transmitting and receiving circuit 930 includes one or more signal transmitting and receiving modules. Each signal transmitting and receiving module includes, but is not limited to function submodules that have functions such as capture, filtering, signal amplification, power amplification, radiation, digital to analog conversion and analog to digital conversion, modulation and demodulation, or decoding and encoding of the physical signal. These (sub) modules may be circuits or programs, and multiple transmitting and receiving modules may share one or more function submodules.

The storage medium 920 is a readable and writable medium or a combination of multiple mediums, and includes, but is not limited to an optical storage medium 920, for example, a digital versatile disc (DVD), a magnetic storage device (for example, a magnetic stripe, or a FLOPPY DISK), a random access memory (RAM), a read-only memory (ROM), a programmable ROM (PROM), an erasable PROM (EPROM), a register, a smart card, a flash device, and the like.

The program processing circuit 910 includes a protocol stack module. The protocol stack module is configured to stipulate a network information processing principle, and a function of the protocol stack module is implemented by a protocol stack program. The protocol stack program may include multiple function submodules, such as a physical layer module, a data link layer module, a network layer module, a transport layer module, and an application layer module. The protocol stack program is stored in the storage medium 920, and is executed by the program processing circuit 910.

In this embodiment of the present disclosure, the protocol stack module carries an instruction used for performing the method in the foregoing method embodiment.

In an embodiment, the data transmission method in this embodiment of the present disclosure is implemented in the transport layer module of the protocol stack program.

A term "program" in this embodiment of the present disclosure should be considered as an instruction, code, software, a function, or the like.

Figure 9:
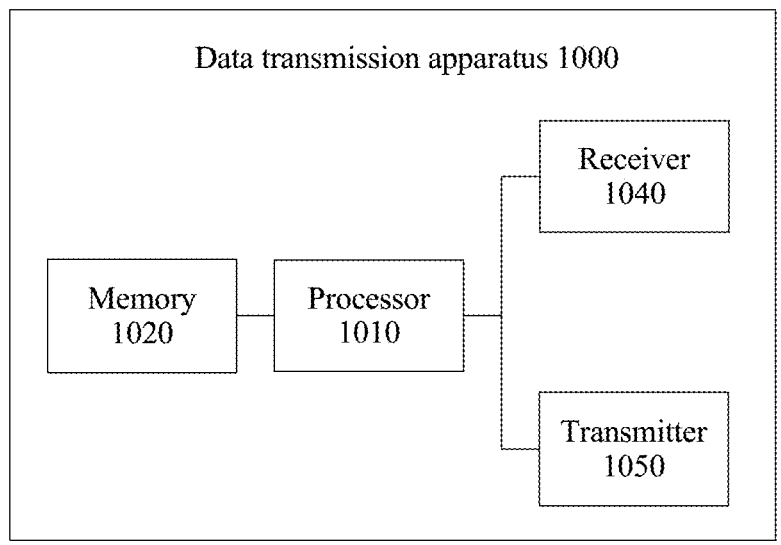
FIG. 9 is yet another schematic block diagram of a data transmission apparatus according to an embodiment of the present disclosure.

As shown in FIG. 9, an embodiment of the present disclosure further provides a data transmission apparatus 1000. The apparatus 1000 may be corresponding to the transmit end in some embodiments in the foregoing, and may be configured to perform all procedures and/or steps corresponding to the transmit end in the foregoing method embodiments. To avoid repetition, details are not described herein. As shown in FIG. 9, the apparatus 1000 includes a processor 1010, a memory 1020, a receiver 1040, and a transmitter 1050. The processor 1010, the memory 1020, the receiver 1040, and the transmitter 1050 communicate with each other using an internal communications link. The memory 1020 is configured to store an instruction. The processor 1010 is configured to execute the instruction stored in the memory 1020. The processor 1010 executes the instruction stored in the memory 1020 to control the receiver 1040 to receive a signal and control the transmitter 1050 to send a signal. The processor 1010 is configured to determine a redundancy time according to a delay requirement of a service, where the redundancy time indicates a time used for transmitting redundant data of native data of the service, and the redundancy time is less than or equal to a time indicated by the delay requirement, determine a redundancy quantity N, where the redundancy quantity N indicates a quantity of times of transmitting the redundant data, and N is a positive integer, and determine N redundancy transmission time intervals according to the redundancy time and the redundancy quantity N, where a total time of the N redundancy transmission time intervals is less than or equal to the redundancy time. The transmitter 1050 is configured to, after the native data of the service is sent, if feedback data is not received within an $n^{th}$ redundancy transmission time interval, send the redundant data for the $n^{th}$ time according to the $n^{th}$ redundancy transmission time interval, where n is 1, . . . , or N.

According to the data transmission apparatus in this embodiment of the present disclosure, unnecessary redundancy transmission can be effectively reduced.

Optionally, in this embodiment of the present disclosure, the N redundancy transmission time intervals include $N_1$ first redundancy transmission time intervals and $N_2$ second redundancy transmission time intervals. The $N_1$ first redundancy transmission time intervals are all greater than the $N_2$ second redundancy transmission time intervals. The $N_1$ first redundancy transmission time intervals are all earlier than the $N_2$ second redundancy transmission time intervals in terms of a time sequence, and a sum of $N_1$ and $N_2$ is equal to N.

Optionally, in this embodiment of the present disclosure, the $N_1$ first redundancy transmission time intervals are all no less than a trusted feedback time, and the $N_2$ second redundancy transmission time intervals are all less than the trusted feedback time. The trusted feedback time indicates a time from a time point at which a transmit end sends data to a time point at which feedback data corresponding to the data is received by the transmit end.

Optionally, in this embodiment of the present disclosure, $N_2$ is equal to 1, and the $N_1$ first redundancy transmission time intervals are all equal to the trusted feedback time.

Optionally, in this embodiment of the present disclosure, the processor 1010 is configured to determine the $n^{th}$ redundancy transmission time interval $T_p(n)$ according to the following formula:

$$T_p(n) = \text{MAX}\left(T_t \cdot \frac{2^{N-n}}{2^N - 1}, TTI_{min}\right),$$

where MAX( ) indicates a function for obtaining a maximum value, $T_t$ indicates the redundancy time, and $TTI_{min}$ indicates a minimum transmission time interval.

Optionally, in this embodiment of the present disclosure, the processor is configured to calculate the redundancy quantity N according to the following formula:

$$N = INT\left(\log_{LR}^{(1-SR)}\right),$$

where INT( ) is an integral function, LR indicates a packet loss rate, and SR indicates a delay assurance rate.

Optionally, in this embodiment of the present disclosure, the transmitter 1050 is further configured to, after the native data of the service is sent, if the feedback data is received within the $n^{th}$ redundancy transmission time interval, stop transmitting the redundant data.

Optionally, in this embodiment of the present disclosure, the processor 1010 may be a CPU, or the processor 1010 may be another general purpose processor, a DSP, an ASIC, an FPGA or another programmable logic device, a discrete gate, a transistor logic device, a discrete hardware component, or the like. The general purpose processor may be a microprocessor or any conventional processor.

The memory 1020 may include a ROM and a RAM, and provide an instruction and data for the processor 1010. A part of the memory 1020 may further include a nonvolatile RAM (NVRAM). For example, the memory 1020 may further store information about a device type.

In an implementation process, all steps in the foregoing method may be performed using an integrated logic circuit of hardware in the processor 1010 or an instruction in a form of software. The steps of the method disclosed with reference to the embodiments of the present disclosure may be directly performed by a hardware processor, or may be performed using a combination of hardware in the processor and a software module. The software module may be located in a mature storage medium in the field, such as a RAM, a flash memory, a ROM, a PROM, an electrically-erasable PROM (EEPROM), or a register. The storage medium is located in the memory 1020. The processor 1010 reads information from the memory 1020, and completes the steps of the foregoing method with reference to hardware of the processor 1010. To avoid repetition, details are not described herein.

According to the data transmission apparatus in this embodiment of the present disclosure, unnecessary redundancy transmission can be effectively reduced.

Figure 10A:
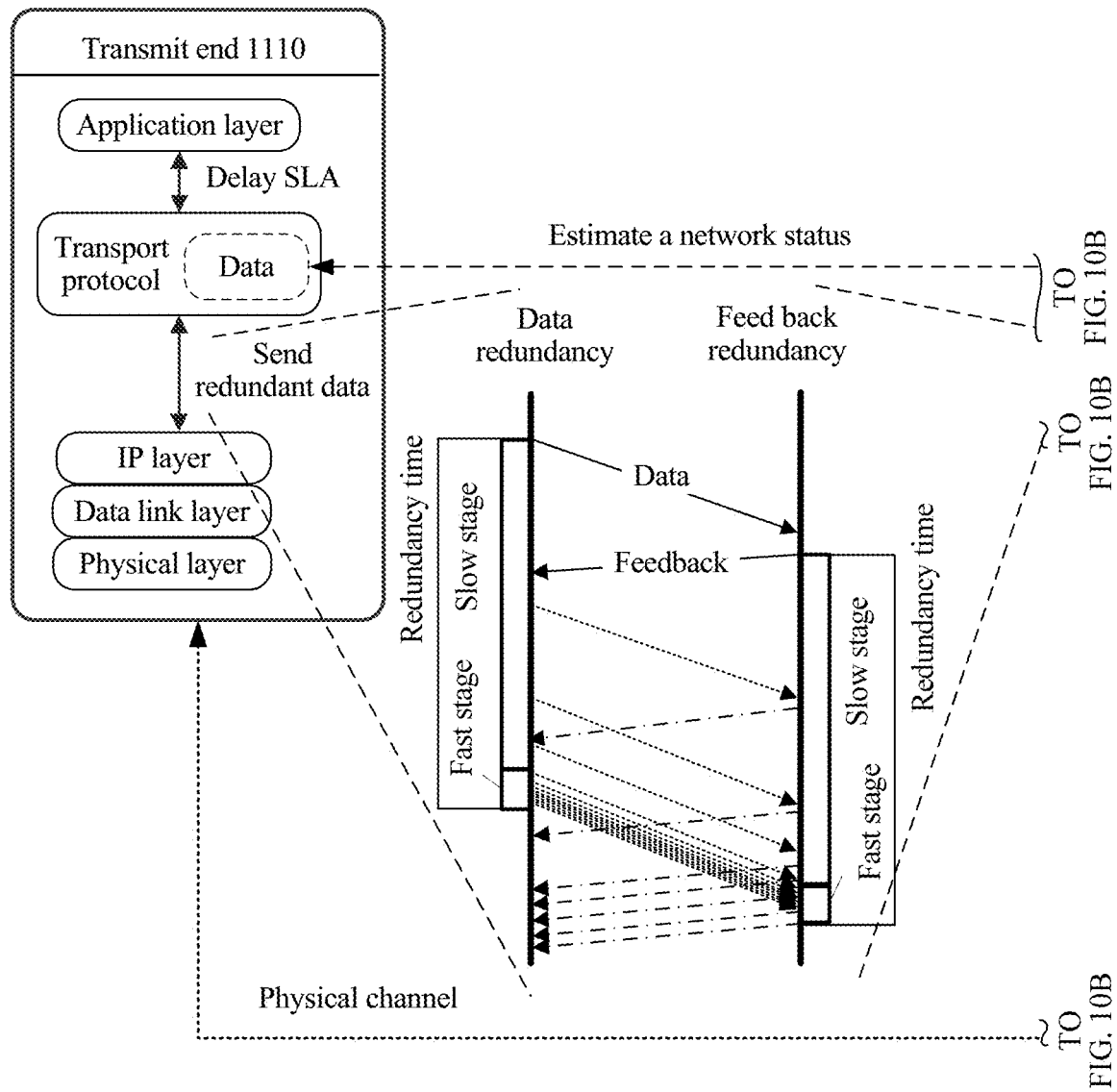
FIG. 10A and FIG. 10B are a schematic diagram of a data transmission system according to an embodiment of the present disclosure.
Figure 10B:
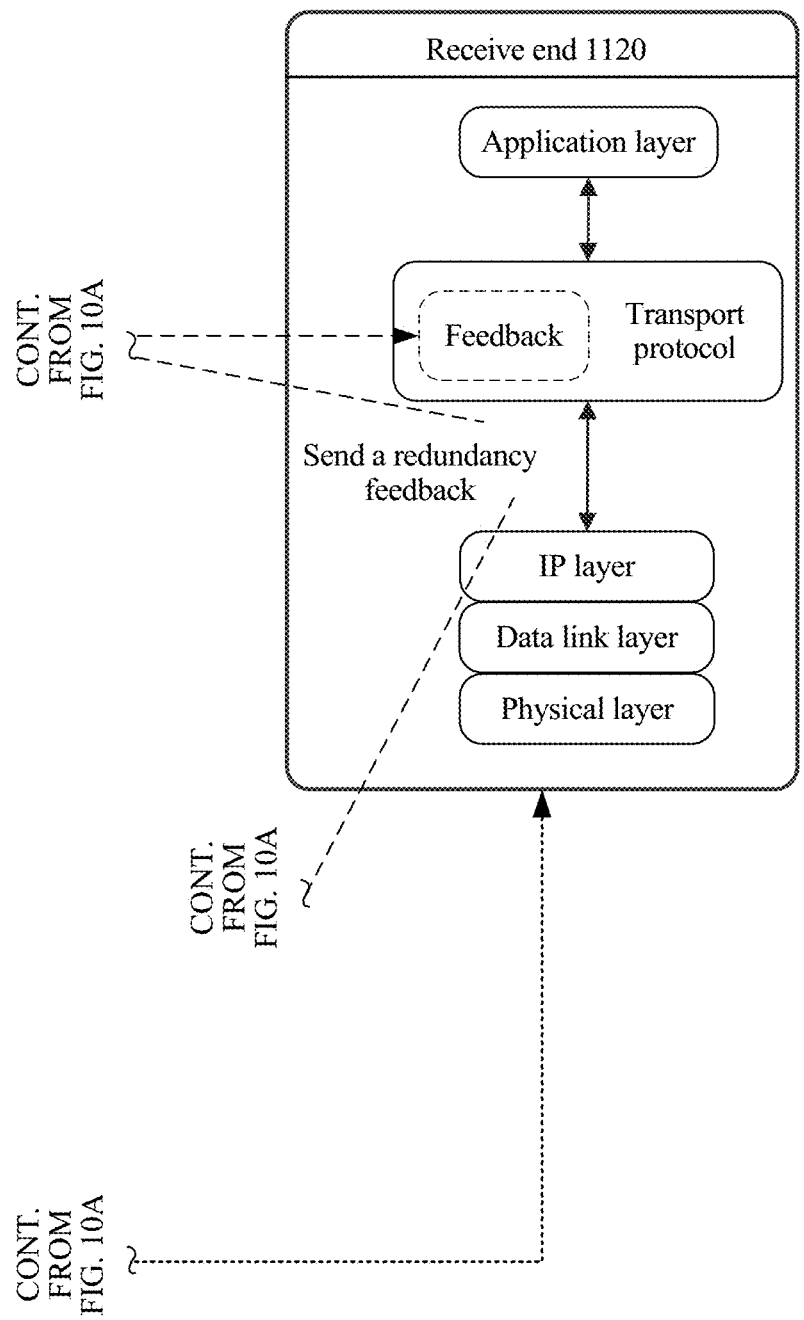

FIG. 10A and FIG. 10B are a schematic diagram of a data transmission system 1100 according to an embodiment of the present disclosure. The system 1100 includes a transmit end 1110 and a receive end 1120. The transmit end 1110 corresponds to the transmit end in the data transmission method in the embodiment of the present disclosure, and may be further corresponding to the data transmission apparatus 700 and the data transmission apparatus 800 in embodiments of the present disclosure. The receive end 1120 corresponds to the receive end in the data transmission method in the embodiment of the present disclosure.

The transmit end 1110 obtains a delay SLA of a service using an application program module of an application layer, determines a redundancy time according to the delay SLA, estimates a packet loss rate by estimating a network status, determines a redundancy quantity N according to the packet loss rate and a delay assurance rate, determines N redundancy transmission time intervals according to the redundancy time and the redundancy quantity, where the N redundancy transmission time intervals include $N_1$ first redundancy transmission time intervals and $N_2$ second redundancy transmission time intervals, the $N_1$ first redundancy transmission time intervals are all no less than a trusted feedback time, and the $N_2$ second redundancy transmission time intervals are all less than the trusted feedback time, and sends redundant data to the receive end 1120 according to the N redundancy transmission time intervals.

For a process of transmitting the redundant data and transmitting feedback data between the transmit end 1110 and the receive end 1120 based on the N redundancy transmission time intervals, refer to enlarged figures of "redundant data transmission" and "redundancy feedback transmitting" shown in FIGS. 10A and 10B.

A slow stage shown in FIGS. 10A and 10B corresponds to the $N_1$ first redundancy transmission time intervals in this embodiment of the present disclosure, and a fast stage shown in FIGS. 10A and 10B corresponds to the $N_2$ second redundancy transmission time intervals in this embodiment of the present disclosure. It may be understood that the N redundancy transmission time intervals determined by the transmit end 1110 means that a process of transmitting the redundant data is divided into two stages the slow stage and the fast stage.

After native data of the service is sent, if feedback data is not received within an $n^{th}$ redundancy transmission time interval, the transmit end sends redundant data of the native data for the $n^{th}$ time according to the $n^{th}$ redundancy transmission time interval, where n is 1, . . . , or N. If the feedback data is received within the $n^{th}$ redundancy transmission time interval, the transmit end stops transmitting the redundant data of the original data.

As shown in FIGS. 10A and 10B, an action of determining the N redundancy transmission time intervals is performed at a transport layer of the transmit end 1110.

As shown in FIGS. 10A and 10B, both the transmit end 1110 and the receive end 1120 include a protocol about the following five layers a physical layer, a data link layer, an IP layer, a transport layer, and an application layer. It should be understood that, from a perspective of a logical layer, data (including the original data, the redundant data, and the feedback data) transmission between the transmit end 1110 and the receive end 1120 may be directly performed at the transport layer, and from a perspective of a physical implementation layer, the data transmission between the transmit end and the receive end is performed using a physical channel. Further, to-be-sent data determined by the transmit end 1110 at the transport layer is processed successively at the IP layer, the data link layer, and the physical layer of the transmit end 1110, and finally reaches the physical layer of the receive end 1120 by passing through the physical channel. The data received at the physical layer of the receive end 1120 is processed successively at the data link layer and the IP layer of the receive end 1120, and finally reaches the transport layer to be correspondingly processed.

It should be further understood that digital numbers related in this specification are distinguished only for ease of description, and are not used to limit a scope of the embodiments of the present disclosure.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may be not physically separate, and parts displayed as units may or may be not physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB)

flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   determining a redundancy time according to a delay requirement of a service, the redundancy time indicating a time of transmitting redundant data, the redundant data being a redundant data of native data of the service, and the redundancy time being less than or equal to a time indicated by the delay requirement;
   determining a redundancy quantity indicating a quantity of times of transmitting the redundant data, the redundancy quantity being N, and the N being a positive integer;
   determining N redundancy transmission time intervals according to the redundancy time and the redundancy quantity, a total time of the N redundancy transmission time intervals being less than or equal to the redundancy time; and
   transmitting the redundant data for an $n^{th}$ time according to an $n^{th}$ redundancy transmission time interval ($T_p(n)$) after transmitting the native data of the service and when feedback data is not received within the $T_p(n)$, the n being 1, . . . , or N.

2. The method of claim 1, wherein the N redundancy transmission time intervals comprise $N_1$ first redundancy transmission time intervals and $N_2$ second redundancy transmission time intervals, the $N_1$ first redundancy transmission time intervals being all greater than the $N_2$ second redundancy transmission time intervals, the $N_1$ first redundancy transmission time intervals being all earlier than the $N_2$ second redundancy transmission time intervals in terms of a time sequence, and a sum of the $N_1$ and the $N_2$ being equal to the N.

3. The method of claim 2, wherein the $N_1$ first redundancy transmission time intervals are all greater than or equal to a trusted feedback time, the $N_2$ second redundancy transmission time intervals being all less than the trusted feedback time, and the trusted feedback time indicating a time from a time point at which a transmit end sends data to a time point at which feedback data corresponding to the data is received by the transmit end.

4. The method of claim 3, wherein the $N_2$ is equal to one, and the $N_1$ first redundancy transmission time intervals being all equal to the trusted feedback time.

5. The method of claim 1, wherein determining the N redundancy transmission time intervals comprises determining the $T_p(n)$ according to the following formula:

$$T_p(n) = \text{MAX}\left(T_t \cdot \frac{2^{N-n}}{2^N - 1}, TTI_{min}\right),$$

the MAX( ) indicating a function for obtaining a maximum value, the $T_t$ indicating the redundancy time, and the $TTI_{min}$ indicating a minimum transmission time interval.

6. The method of claim 1, wherein determining the redundancy quantity comprises calculating the redundancy quantity according to the following formula:

$$N = INT\left(\log_{LR}^{(1-SR)}\right),$$

the INT( ) being an integral function, the LR indicating a packet loss rate, and the SR indicating a delay assurance rate.

7. The method of claim 1, further comprising stop transmitting the redundant data after transmitting the native data of the service and in case of the feedback data is received within the $T_p(n)$.

8. A data transmission apparatus, comprising:
   a memory configured to store an instruction; and
   a processor coupled to the memory, the instruction causing the processor to be configured to:
   determine a redundancy time according to a delay requirement of a service, the redundancy time indicating a time used for transmitting redundant data of native data of the service, and the redundancy time being less than or equal to a time indicated by the delay requirement;
   determine a redundancy quantity indicating a quantity of times of transmitting the redundant data, the redundancy quantity being N, and the N being a positive integer;
   determine N redundancy transmission time intervals according to the redundancy time and the redundancy quantity, a total time of the N redundancy transmission time intervals being less than or equal to the redundancy time; and
   send the redundant data for an $n^{th}$ time according to an $n^{th}$ redundancy transmission time interval ($T_p(n)$) after transmitting the native data of the service and when feedback data is not received within the $T_p(n)$, the n being 1, . . . , or N.

9. The apparatus of claim 8, wherein the N redundancy transmission time intervals comprise $N_1$ first redundancy transmission time intervals and $N_2$ second redundancy transmission time intervals, the $N_1$ first redundancy transmission time intervals being all greater than the $N_2$ second redundancy transmission time intervals, the $N_1$ first redundancy transmission time intervals being all earlier than the $N_2$ second redundancy transmission time intervals in terms of a time sequence, and a sum of the $N_1$ and the $N_2$ being equal to the N.

10. The apparatus of claim 9, wherein the $N_1$ first redundancy transmission time intervals are all greater than or equal to a trusted feedback time, the $N_2$ second redundancy transmission time intervals being all less than the trusted feedback time, and the trusted feedback time indicating a time from a time point at which a transmit end sends data to a time point at which feedback data corresponding to the data is received by the transmit end.

11. The apparatus of claim 10, wherein the $N_2$ is equal to one, and the $N_1$ first redundancy sending time intervals being all equal to the trusted feedback time.

12. The apparatus of claim 10, wherein the instruction further causes the processor to be configured to determine the $T_p(n)$ according to the following formula:

$$T_p(n) = \text{MAX}\left(T_t \cdot \frac{2^{N-n}}{2^N - 1}, TTI_{min}\right),$$

the MAX( ) indicating a function for obtaining a maximum value, the $T_t$ indicating the redundancy time, and the $TTI_{min}$ indicating a minimum transmission time interval.

13. The apparatus of claim 8, wherein the instruction further causes the processor to be configured to calculate the redundancy quantity according to the following formula:

$$N = INT\left(\log_{LR}^{(1-SR)}\right),$$

the INT( ) being an integral function, the LR indicating a packet loss rate, and the SR indicating a delay assurance rate.

14. The apparatus of claim 8, wherein the instruction further causes the processor to be configured to stop transmitting the redundant data after transmitting the native data of the service and when the feedback data is received within the $T_p(n)$.

15. A non-transitory computer-readable medium storing computer instructions that, when executed by one or more processors, cause the one or more processors to:
determine a redundancy time according to a delay requirement of a service, the redundancy time indicating a time of transmitting redundant data, the redundant data being a redundant data of native data of the service, and the redundancy time being less than or equal to a time indicated by the delay requirement;
determine a redundancy quantity indicating a quantity of times of transmitting the redundant data, the redundancy quantity being N, and the N being a positive integer;
determine N redundancy transmission time intervals according to the redundancy time and the redundancy quantity, a total time of the N redundancy transmission time intervals being less than or equal to the redundancy time; and
transmit the redundant data for an $n^{th}$ time according to an $n^{th}$ redundancy transmission time interval ($T_p(n)$) after transmitting the native data of the service and when feedback data is not received within the $T_p(n)$, and the n being 1, . . . , or N.

16. The medium of claim 15, wherein the N redundancy transmission time intervals comprise $N_1$ first redundancy transmission time intervals and $N_2$ second redundancy transmission time intervals, the $N_1$ first redundancy transmission time intervals being all greater than the $N_2$ second redundancy transmission time intervals, the $N_1$ first redundancy transmission time intervals being all earlier than the $N_2$ second redundancy transmission time intervals in terms of a time sequence, and a sum of the $N_1$ and the $N_2$ being equal to the N.

17. The medium of claim 16, wherein the $N_1$ first redundancy transmission time intervals are all greater than or equal to a trusted feedback time, the $N_2$ second redundancy transmission time intervals being all less than the trusted feedback time, and the trusted feedback time indicating a time from a time point at which a transmit end sends data to a time point at which feedback data corresponding to the data is received by the transmit end.

18. The medium of claim 17, wherein the $N_2$ is equal to one, and the $N_1$ first redundancy transmission time intervals being all equal to the trusted feedback time.

19. The medium of claim 15, wherein in a manner of determining the N redundancy transmission time intervals, the computer instructions further cause the one or more processors to be configured to determine the $T_p(n)$ according to the following formula:

$$T_p(n) = MAX\left(T_t \cdot \frac{2^{N-n}}{2^N - 1}, TTI_{min}\right),$$

the MAX( ) indicating a function for obtaining a maximum value, the $T_t$ indicating the redundancy time, and the $TTI_{min}$ indicating a minimum transmission time interval.

20. The medium of claim 15, wherein in a manner of determining the redundancy quantity, the computer instructions further cause the one or more processors to be configured to calculate the redundancy quantity according to the following formula:

$$N = INT\left(\log_{LR}^{(1-SR)}\right),$$

the INT( ) being an integral function, the LR indicating a packet loss rate, and the SR indicating a delay assurance rate.

* * * * *